United States Patent
Imamoto et al.

(10) Patent No.: US 10,944,085 B2
(45) Date of Patent: Mar. 9, 2021

(54) OUTER COVERING MATERIAL FOR ELECTRICITY STORAGE DEVICES, AND ELECTRICITY STORAGE DEVICE

(71) Applicant: TOPPAN PRINTING CO., LTD., Tokyo (JP)

(72) Inventors: Junya Imamoto, Tokyo (JP); Yu Ogihara, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/482,644

(22) PCT Filed: Jan. 29, 2018

(86) PCT No.: PCT/JP2018/002787
§ 371 (c)(1),
(2) Date: Jul. 31, 2019

(87) PCT Pub. No.: WO2018/147117
PCT Pub. Date: Aug. 16, 2018

(65) Prior Publication Data
US 2020/0013999 A1    Jan. 9, 2020

(30) Foreign Application Priority Data
Feb. 8, 2017    (JP) .............................. JP2017-021329

(51) Int. Cl.
*H01M 2/08*    (2006.01)
*H01M 2/06*    (2006.01)
(Continued)

(52) U.S. Cl.
CPC ............. *H01M 2/08* (2013.01); *B32B 15/085* (2013.01); *H01G 11/80* (2013.01); *H01M 2/06* (2013.01);
(Continued)

(58) Field of Classification Search
CPC ...................................................... H01M 2/08
See application file for complete search history.

(56) References Cited

U.S. PATENT DOCUMENTS

2017/0018744 A1*  1/2017  Ogihara .............. H01M 2/0262
2017/0155101 A1*  6/2017  Mochizuki .......... H01M 2/0287
2018/0076421 A1*  3/2018  Ogihara ................ H01G 11/78

FOREIGN PATENT DOCUMENTS

EP    2 629 348 A1    8/2013
EP    3 116 044 A1    1/2017
(Continued)

OTHER PUBLICATIONS

International Search Report dated May 1, 2018 in corresponding International Patent Application No. PCT/JP2018/002787.
(Continued)

*Primary Examiner* — Brian R Ohara

(57) ABSTRACT

A packaging material for a power storage device, having a structure in which at least a substrate layer, a metallic foil layer with an anti-corrosion treatment layer being disposed on one face or both faces thereof, an adhesive layer or an adhesive resin layer, and a sealant layer are laminated in this order, wherein at least one layer of the adhesive resin layer and the sealant layer comprises a polyolefin-based resin, and an additive compound with an SP value of 11.0 $(cal/cm^3)^{1/2}$ or more and 20.0 $(cal/cm^3)^{1/2}$ or less.

7 Claims, 8 Drawing Sheets

(51) Int. Cl.
*H01M 10/04* (2006.01)
*H01M 10/0525* (2010.01)
*H01G 11/80* (2013.01)
*B32B 15/085* (2006.01)

(52) U.S. Cl.
CPC ....... *H01M 10/04* (2013.01); *H01M 10/0525* (2013.01)

(56) References Cited

FOREIGN PATENT DOCUMENTS

| | | |
|---|---|---|
| JP | 2002-245983 | 8/2002 |
| JP | 2016-136541 | 7/2016 |
| JP | 2016-207564 | 12/2016 |
| WO | WO-2015152397 A1 * | 10/2015 ........ H01M 10/0525 |
| WO | WO 2016/125684 A1 | 8/2016 |
| WO | WO 2017/217229 A1 | 12/2017 |

OTHER PUBLICATIONS

English Translation by WIPO of the International Preliminary Report on Patentability dated Aug. 22, 2019 in corresponding International Patent Application No. PCT/JP2018/002787.
Extended European Search Report dated Nov. 4, 2020 in European Patent Application No. 18751065.6.

* cited by examiner

INJECTION

25V APPLIED

OUTER COVERING MATERIAL FOR ELECTRICITY STORAGE DEVICES, AND ELECTRICITY STORAGE DEVICE

CROSS-REFERENCE TO RELATED APPLICATIONS

This application is a U.S. National Stage Application, which claims the benefit under 35 U.S.C. § 371 of PCT International Patent Application No. PCT/JP2018/002787, filed Jan. 29, 2018 which claims the foreign priority benefit under 35 U.S.C. § 119 of Japanese Patent Application No. 2017-021329, filed Feb. 8, 2017, the contents of which are incorporated herein by reference.

TECHNICAL FIELD

The present invention relates to a packaging material for a power storage device and a power storage device.

BACKGROUND ART

As power storage devices, secondary batteries such as lithium ion batteries, nickel-hydrogen batteries and lead storage batteries, as well as electrochemical capacitors such as electric double layer capacitors are known, for example. In view of downsizing of mobile devices, limitation in space for installation, or the like, further downsizing of power storage devices has been required, and lithium ion batteries with high energy density have been watched with interest. As packaging materials for use in lithium ion batteries, metallic cans had conventionally been used; however, multi-layered films with light weight, high heat releasing ability, and being able to be produced with a low cost (for example, films having a configuration like substrate layer/metallic foil layer/sealant layer) have started to be used.

In a lithium ion battery using the above multi-layered film as a packaging material, a configuration for covering the battery contents with a packaging material including an aluminum foil layer as a metallic foil layer has been employed in order to prevent infiltration of moisture into the interior of the lithium ion battery. Lithium ion batteries in which such a configuration is employed are referred to as lithium ion batteries of an aluminum laminated type. In battery contents within lithium ion batteries, a positive electrode, a negative electrode and a separator, as well as an electrolytic solution in which a lithium salt as an electrolyte has been dissolved into an aprotic solvent having osmotic force, such as propylene carbonate, ethylene carbonate, dimethyl carbonate, diethyl carbonate, ethyl methyl carbonate or the like, or an electrolyte layer consisting of a polymeric gel impregnated with the electrolytic solution are included.

As a lithium ion battery of an aluminum laminated type, an lithium ion battery of an embossed type in which a depressed part is formed on a portion of a packaging material by cold molding, and battery contents are held in the depressed part, and the remaining portion of the packaging material is folded back to seal the edge of the packaging material by heat seal is known, for example. Packaging materials constituting such a lithium ion battery have been required to exhibit steady sealability resulting from heat seal, and also required to tend not to occur decrease in laminating strength between an aluminum foil layer and a sealant layer due to an electrolytic solution of the battery contents.

Also, thinning of a substrate layer, a metallic foil layer and a sealant layer in a packaging material for a power storage device is advancing with downsizing of power storage devices, and in these situations, decrease in the insulation properties due to the sealant layer being thinned is problematic.

Therefore, for example, in Patent Literature 1, a packaging material is proposed, the packaging material comprising a heat seal layer (sealant layer) including an adhesive polymethyl pentene layer, and as a result of this, the packaging material being able to be steadily sealed by heat and pressure in heat seal without short circuit between a barrier layer and tabs of the packaging material.

CITATION LIST

Patent Literature

Patent Literature 1: Japanese Unexamined Patent Application Publication No. 2002-245983

SUMMARY OF INVENTION

Technical Problem

In order to allow a lithium ion battery to store energy, it is necessary to perform charge and discharge of the lithium ion battery under predetermined conditions of an electrical current value, a voltage value, an ambient temperature and the like to occur chemical change (chemical conversion). This chemical conversion step is performed with the lithium ion battery being a temporal battery to which an electrolytic solution is injected. Then, once the battery is opened for removal of a gas generated by chemical conversion or for reloading of the electrolytic solution, final seal is subsequently performed to manufacture a battery. This final seal seals a portion of the battery that have been dipped into the electrolytic solution once, this final seal is therefore a degassing seal (degassing heat seal) in which heat seal is performed while sandwiching the electrolytic solution between portions to be heat-sealed.

In a conventional packaging material as described in the above Patent Literature 1, a solution to decrease in insulation properties due to contact between tab leads and a metallic foil layer has been accomplished. However, according to investigations by the present inventors up to now, it has been found that decrease in insulation properties are often caused by destruction of a sealant layer due to degassing heat sealing, and solution to this decrease in insulation properties is of highly importance. In Patent Literature 1, studies with regard to the destruction of a sealant layer due to degassing heat sealing have not been accomplished.

A degassing heat seal heat-seals portions while sandwiching the electrolytic solution between the portions to be heat-sealed when a packaging material accommodating battery contents is sealed by heat seal, and therefore, in some cases, the electrolytic solution bubbles and the sealant layer is destructed. Then, it is considered that the electrolytic solution enters from a portion of the sealant layer being destructed, and contacts a metallic foil layer, and as a result of this, insulation properties decrease.

In addition, the decrease in insulation properties resulting from the destruction of the sealant layer due to the degassing heat seal tends to be influenced by thinning of the sealant layer, and therefore, among improvements in insulation properties, a solution to this decrease in insulation properties is particularly demanded toward the future.

The present invention has been accomplished in view of the problems that the above conventional technology has, and it is an object of the present invention to provide a packaging material for a power storage device, the packaging material being able to suppress the decrease in insulation properties after degassing heat sealing without impairing the fundamental performance of the packaging material, and a power storage device using this packaging material.

Solution to Problem

In order to accomplish the above object, the present invention provides a packaging material for a power storage device having a structure in which at least a substrate layer, a metallic foil layer with an anti-corrosion treatment layer being disposed on one face or both faces thereof, an adhesive layer or an adhesive resin layer, and a sealant layer are laminated in this order, wherein at least one layer of the above adhesive resin layer and the above sealant layer comprises a polyolefin-based resin, and an additive compound with an SP value of 11.0 $(cal/cm^3)^{1/2}$ or more and 20.0 $(cal/cm^3)^{1/2}$ or less.

On the basis of a packaging material for a power storage device having the above configuration, even when the sealant layer is thinned, it is possible to suppress the decrease in insulation properties after degassing heat sealing without impairing the fundamental performance of the packaging material. The present inventors presume that the reason why the above packaging material for a power storage device achieves such an effect is as follows.

It is considered that the destruction of the adhesive resin layer and/or the sealant layer and the decrease in insulation properties due to degassing heat sealing result from the following phenomena of (1) to (3).
(1) The adhesive resin layer and/or the sealant layer is swelled due to the electrolytic solution.
(2) Due to heat in a heat seal, the electrolytic solution in the adhesive resin layer and/or the sealant layer bubbles to form voids in the adhesive resin layer and/or the sealant layer (the adhesive resin layer and/or the sealant layer is partially destructed).
(3) As voids forms, a portion of the metallic foil layer is exposed, and the electrolytic solution entering the voids comes into contact with an exposed portion of the metallic foil, and as a result of this, insulation properties decrease.

Therefore, in order to suppress the decrease in insulation properties after degassing heat sealing, it is important to prevent generation of any of the phenomena of (1) to (3) described above.

As a result of diligent studies, the present inventors have found that, by using a polyolefin-based resin, and an additive compound of which an SP value is 11.0 $(cal/cm^3)^{1/2}$ or more and 20.0 $(cal/cm^3)^{1/2}$ or less in at least one layer of the adhesive resin layer and the sealant layer, it is possible to suppress the swelling of the adhesive resin layer and/or the sealant layer due to the electrolytic solution (phenomenon of the above (1)). It is considered that the swelling of the adhesive resin layer and/or the sealant layer due to the electrolytic solution results from the fact that the SP value of the resin constituting the adhesive resin layer and/or the sealant layer, and the SP value of the electrolytic solution used in the power storage device are close to each other. In the present invention, it has been found that it is possible to suppress the swelling by maintaining the fundamental performance of the packaging material (laminating strength and heat seal strength) by using a polyolefin-based resin, and adding thereto an additive compound having the above-described certain SP value. The range of the SP value of the above additive compound is relatively higher than the SP value of the electrolytic solution, and it is presumed that, by adding this additive compound having a high SP value to the polyolefin-based resin, swelling of the adhesive resin layer and/or the sealant layer due to the electrolytic solution tended not to occur, and it was possible to suppress the destruction of the adhesive resin layer and/or the sealant layer in degassing heat sealing, and the decrease in insulation properties due to this destruction. In this regard, when the difference between the SP value of the polyolefin-based resin and the SP value of the additive compound is too large, the dispersibility of the additive compound becomes worse to result in decrease in fundamental performance of the packaging material, and therefore, the SP value of the additive compound is required to be 20.0 $(cal/cm^3)^{1/2}$ or less. In this way, according to the present invention, by using the additive compound having the above certain SP value, it is possible to provide a packaging material for a power storage device that can suppress the decrease in insulation properties after degassing heat sealing without impairing the fundamental performance of the packaging material. Note that, conventionally, there has been no knowledge with regard to the fact that, instead of the SP value of the polyolefin-based resin itself, the SP value of the additive compound greatly contributes to suppression of the decrease in insulation properties after degassing heat sealing, and it has not been expected that, as in the present invention, an effect of improving the insulation properties after degassing heat sealing is obtained by addition of an additive compound having certain SP value.

In the above packaging material for a power storage device, it is preferable that the molecular weight of the above additive compound be 100 or more and 6000 or less. When the molecular weight of the additive compound is in the above range, the dispersibility of the additive compound in the polyolefin-based resin is good, and in addition, the additive compound tends not to undergo bleeding out. As a result of this, the effect of suppressing the decrease in insulation properties after degassing heat sealing is obtained more sufficiently, and in addition, it is possible to achieve good fundamental performance of the packaging material such as laminating strength and heat seal strength.

In the above packaging material for a power storage device, the above polyolefin-based resin may comprise a polypropylene-based resin, wherein the above sealant layer may comprise at least one of a propylene-α-olefin copolymer as an compatible elastomer having compatibility with the above polypropylene-based resin, and an ethylene-α-olefin copolymer as an incompatible elastomer not having compatibility with the above polypropylene-based resin. By adding the compatible elastomer to the polypropylene-based resin, it is possible to impart flexibility to the sealant layer. By imparting the flexibility to the sealant layer, it is possible to impart functions such as molding whitening resistance and impact resistance to the sealant layer, and it is possible to provide a packaging material with further improved functionalities. Also, the propylene-α-olefin copolymer can further improve the sealing properties in the case of involvement of the electrolytic solution such as the electrolytic solution laminating strength and the degassing heat seal strength. On the other hand, by adding the incompatible elastomer to the polypropylene-based resin, it is possible to impart impact resistance and low-temperature resistance to the sealant layer. Also, the ethylene-α-olefin copolymer can further improve the sealing properties in the case of involvement of the electrolytic solution such as the electrolytic solution laminating strength, and the degassing heat seal strength. Also, it is possible to add only one of these compatible and incompatible elastomers of two kinds; however, in the case of using both of these compatible and incompatible elastomers in combination, it is possible to improve the molding whitening resistance and the sealing properties in the case of involvement of the electrolytic solution in a balanced manner.

In the above packaging material for a power storage device, the above adhesive resin layer may comprise acid-modified polypropylene, and a polypropylene with an atactic structure or a propylene-α-olefin copolymer with an atactic structure. As a result of this, the decrease in laminating strength in the case of involvement of the electrolytic solution and the decrease in insulation properties tend to be suppressed.

In the above packaging material for a power storage device, the above adhesive layer may comprise an acid-modified polyolefin, and at least one curing agent selected from the group consisting of a multifunctional isocyanate compound, a glycidyl compound, a compound having a carboxy group, a compound having an oxazoline group and a carbodiimide compound. As a result of this, the decrease in laminating strength in the case of involvement of the electrolytic solution, and the decrease in insulation properties tend to be suppressed.

The present invention also provides a power storage device comprising: a battery element comprising electrodes; leads extending from the above electrodes; a vessel accommodating the above battery element; and an electrolytic solution loaded in the above vessel, wherein the above vessel is formed such that the above sealant layer is on the inner side with respect to the above packaging material for a power storage device of the present invention. In such a power storage device, the above packaging material for a power storage device of the present invention is used as a vessel accommodating the battery element, and therefore, the decrease in insulation properties after degassing heat sealing is suppressed. Also, the above power storage device can suppress the decrease in insulation properties even when the packaging material is subjected to heat and/or the electrolytic solution, and can retain the fundamental performance of the packaging material.

In the above power storage device, it is preferable that the difference between the SP value of the above electrolytic solution, and the SP value of the above additive compound in the above packaging material for a power storage device be 2.0 $(\text{cal/cm}^3)^{1/2}$ or more. Due to the fact that there is a difference between the SP value of the electrolytic solution and the SP value of the additive compound of 2.0 $(\text{cal/cm}^3)^{1/2}$ or more, it is possible to suppress the swelling of the adhesive resin layer and/or the sealant layer formed by using the additive compound due to the electrolytic solution more sufficiently, and it is possible to suppress the decrease in insulation properties after degassing heat sealing more sufficiently.

Advantageous Effects of Invention

According to the present invention, it is possible to provide a packaging material for a power storage device that can suppress the decrease in insulation properties after degassing heat sealing without impairing the fundamental performance of the packaging material, and a power storage device using this packaging material.

BRIEF DESCRIPTION OF DRAWINGS

FIG. 7 FIGS. 7(a)-7(c) are schematic views illustrating a method for producing a sample to be evaluated in Examples.

FIG. 8 FIGS. 8(a)-8(g) are schematic views illustrating a method for producing a sample to be evaluated in Examples.

DESCRIPTION OF EMBODIMENTS

Figure 1:
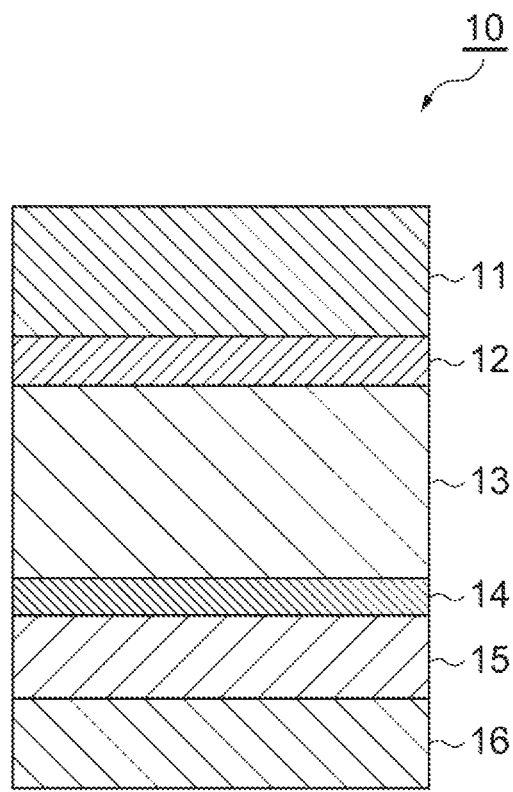
FIG. 1 is a schematic cross-sectional view of a packaging material for a power storage device according to one embodiment of the present invention.

Suitable embodiments of the present invention will be illustrated in detail below with reference to the drawings. Note that, in the drawings, the same or the corresponding parts are provided with the same reference signs, and the overlapping descriptions are omitted. Also, the dimensional ratios in the drawings are not limited to the ratios shown in the drawings.

The packaging material for a power storage device of the present embodiment has a structure in which at least a substrate layer, a metallic foil layer with an anti-corrosion treatment layer being disposed on one face or both faces thereof, an adhesive layer or an adhesive resin layer, and a sealant layer are laminated in this order. In such a packaging material for a power storage device, at least one layer of the adhesive resin layer and the sealant layer is a layer comprising a polyolefin-based resin, and an additive compound of which an SP value is 11.0 $(\text{cal/cm}^3)^{1/2}$ or more and 20.0 $(\text{cal/cm}^3)^{1/2}$ or less. Hereinafter, the packaging material for a power storage device of the present embodiment will be illustrated with reference to several aspects by way of example.

[Packaging Material for Power Storage Device]

FIG. 1 is a cross-sectional view schematically illustrating one embodiment of a packaging material for a power storage device of the present embodiment. As shown in FIG. 1, a packaging material (a packaging material for a power storage device) 10 of the present embodiment is a laminate in which a substrate layer 11, an adhesive layer 12 (sometimes referred to as first adhesive layer 12) formed on one face of the substrate layer 11, a metallic foil layer 13 formed on a face of the first adhesive layer 12 opposite to the substrate layer 11, an anti-corrosion treatment layer 14 formed on a face of the metallic foil layer 13 opposite to the first adhesive layer 12, an adhesive resin layer 15 formed on a face of the anti-corrosion treatment layer 14 opposite to the metallic foil layer 13, and a sealant layer 16 formed on a face of the adhesive resin layer 15 opposite to the anti-corrosion treatment layer 14 are laminated. In the packaging material 10, the substrate layer 11 is the outermost layer, and the sealant layer 16 is the innermost layer. In other words, the packaging material 10 is used such that the substrate layer 11 is directed toward the side of the exterior of the power storage device, and the sealant layer 16 is directed toward on the side of the interior of the power storage device. Each of the layers will be described below.

<Substrate Layer 11>

The substrate layer 11 is provided for the purpose of imparting heat resistance in a sealing step in the production of a power storage device, and achieving the solution to pinholes that can be occurred during the processing or the distribution, and it is preferable to use a resin layer having insulation properties. As such a resin layer, for example, it is possible to use a stretched or unstretched film such as a polyester film, a polyamide film, a polypropylene film, as a single layer, or as a multi-layered film in which two or more thereof are laminated. It is also possible to use a co-extruded multilayered stretched film prepared by the coextrusion of a polyethylene terephthalate (PET) film and a nylon (Ny) film by using an adhesive resin followed by subjecting to stretching treatment.

The substrate layer 11 may be disposed by directly applying the substrate layer 11 on a metallic foil layer 13 described below. In this case, a first adhesive layer 12 described below is not required. As a method for forming the substrate layer by application, it is possible to employ a method for conducting the application of a coating solution of a resin such as an urethane resin, an acrylic resin and a polyester resin, and conducting the curing by ultraviolet irradiation, heating at elevated temperatures, aging (curing) treatment and the like. The application method is not limited in particular, and it is possible to employ a variety of processes such as gravure coating, reverse coating, roll coating and bar coating.

It is preferable that the thickness of the substrate layer 11 be 3 to 40 μm, and it is more preferable that this thickness be 5 to 25 μm. As a result of the fact that the thickness of the substrate layer 11 is 3 μm or more, it tends to enable improvement in pinhole resistance and insulation properties of the packaging material for a power storage device 10.

<First Adhesive Layer 12>

The first adhesive layer 12 is a layer for adhering the substrate layer 11 to the metallic foil layer 13. Specific examples of materials constituting the first adhesive layer 12 include polyurethane resins prepared by reacting a base material such as polyester polyol, polyether polyol, acrylic polyol and carbonate polyol with a bifunctional or higher isocyanate compound.

Depending on functions and performance required for the packaging material, a variety of the polyols described above can be used alone, or used as a combination of two or more thereof.

In addition, for the purpose of the promotion of adhesion, it is possible to mix a carbodiimide compound, an oxazoline compound, an epoxy compound, a phosphorous compound, a silane coupling agent and the like into the above-described polyurethane resin.

Also, depending on performance required for the adhesive, it is also possible to formulate a variety of other additives and stabilizers into the above-described polyurethane resin.

Although the thickness of the first adhesive layer 12 is not limited in particular, it is preferable that the thickness of the first adhesive layer 12 be, for example, 1 to 10 μm, and it is more preferable that this thickness be 3 to 7 μm in view of achieving desired adhesive strength, conformability, processability and the like.

<Metallic Foil Layer 13>

The metallic foil layer 13 has steam barrier properties that prevent infiltration of moisture into the interior of the power storage device. Also, the metallic foil layer 13 has ductility for conducting deep drawing molding. As the metallic foil layer 13, it is possible to use a variety of metallic foils such as aluminum, stainless steel and copper, and in view of mass (specific gravity), moisture proofing, processability and cost, an aluminum foil is preferable.

As the aluminum foil, in view of the impartment of ductility in desired molding, it is possible to preferably use, in particular, a soft aluminum foil subjected to annealing treatment; however, for the purpose of the impartment of further pinhole resistance, and ductility in molding, it is more preferable to use an aluminum foil including iron.

It is preferable that the content of iron in the aluminum foil be 0.1 to 9.0% by mass per 100% by mass of the aluminum foil, and it is more preferable that this content be 0.5 to 2.0% by mass. As a result of the fact that the content of iron is 0.1% by mass or more, it is possible to obtain a packaging material 10 having better pinhole resistance and ductility. As a result of the fact that the content of iron is 9.0% by mass or less, it is possible to obtain a packaging material 10 having better flexibility.

Although the thickness of the metallic foil layer 13 is not limited in particular, it is preferable that the thickness of the metallic foil layer 13 be 9 to 200 μm in view of barrier properties, pinhole resistance and processability, and it is more preferable that this thickness be 15 to 100 μm.

When an aluminum foil is used as the metallic foil layer 13, as an aluminum foil, it is possible to use an untreated aluminum foil; however, it is preferable to use an aluminum foil subjected to degreasing treatment in view of the impartment of electrolytic solution resistance.

Note that, when the aluminum foil is subjected to the degreasing treatment, the degreasing treatment may be conducted on only one face of the aluminum foil, or both faces of the aluminum foil.

<Anti-Corrosion Treatment Layer 14>

The anti-corrosion treatment layer 14 is a layer that is disposed in order to prevent the corrosion of the metallic foil layer 13 by hydrofluoric acid generated from the reaction of the electrolytic solution or electrolytic solution with moisture. The anti-corrosion treatment layer 14 is formed, for example, by degreasing treatment, hydrothermal metamorphism treatment, positive electrode oxidizing treatment, chemical conversion treatment, or combination thereof.

Examples of the degreasing treatment include acid degreasing or alkali degreasing. Examples of the acid degreasing include methods in which an inorganic acid such as sulphuric acid, nitric acid, hydrochloric acid and hydrofluoric acid alone, or a solution of mixture thereof are used. Also, by using, as acid degreasing, an acid degreasing agent prepared by dissolving a fluorine-containing compound such as ammonium monosodium bifluoride with the above inorganic acid, and particularly in the case where an aluminum foil is used as the metallic foil layer 13, not only degreasing effect from aluminum is obtained, but also a fluoride of aluminum in the passivated form can be formed, and therefore, this is effective in view of hydrofluoric acid resistance. Examples of the alkali degreasing include methods using sodium hydroxide and the like.

Examples of the hydrothermal metamorphism treatment include boehmite treatment in which an aluminum foil is subjected to immersion treatment in boiled water with addition of triethanolamine.

Examples of the positive electrode oxidizing treatment include alumite treatment.

Examples of the chemical conversion treatment include chemical conversion treatment of a dipping type and chemical conversion treatment of a coating type. Examples of the chemical conversion treatment of the dipping type include chromate treatment, zirconium treatment, titanium treatment, vanadium treatment, molybdenum treatment, calcium phosphate treatment, strontium hydroxide treatment, cerium treatment, ruthenium treatment, or a variety of chemical conversion treatment consisting of mixed phase thereof. On the other hand, examples of the chemical conversion treatment of the coating type include a method for applying a coating agent having anti-corrosion performance on the metallic foil layer 13.

Among the anti-corrosion treatment, in the case where at least a portion of the anti-corrosion treatment layer is formed by any of the hydrothermal metamorphism treatment, the positive electrode oxidizing treatment, the chemical conversion treatment, it is preferable to conduct the above-described degreasing treatment in advance. Note that when a metallic foil that has been subjected to the degreasing treatment such as a metallic foil underwent the annealing step is used as the metallic foil layer 13, there is no need to conduct the degreasing treatment again in the formation of the anti-corrosion treatment layer 14.

The coating agent for use in the chemical conversion treatment of the coating type preferably contains trivalent chrome. Also, at least one polymer selected from the group consisting of a cationic polymer and an anionic polymer that are described below may be included in the coating agent.

Also, among the above treatment, particularly with regard to the hydrothermal metamorphism treatment and the positive electrode oxidizing treatment, a surface of an aluminum foil is dissolved with a treating agent to form an aluminum compound (boehmite, alumite) excellent in corrosion resistance. As a result of this, a co-continuous structure from the metallic foil layer 13 using the aluminum foil up to the anti-corrosion treatment layer 14 forms, and therefore, the above treatment is encompassed in the definition of the chemical conversion treatment. On the other hand, it is also possible to form the anti-corrosion treatment layer 14 only by a simple coating approach that is not encompassed in the definition of the chemical conversion treatment as described below. Examples of this method include a method in which a sol of a rare earth element oxide such as cerium oxide with an average particle size of 100 nm or less is used as a material having anti-corrosion effect (inhibitor effect) due to aluminum, and being suitable with regard to an environmental aspect. By means of this method, it is possible to impart the anti-corrosion effect to a metallic foil such as an aluminum foil, even by a typical coating.

Examples of the above sol of the rare earth element oxide include sols obtained by using a variety of solvents such as water-based solvents, alcohol-based solvents, hydrocarbon-based solvents, ketone-based solvents, ester-based solvents and ether-based solvents. Among these, a water-based sol is preferable.

In the above sol of the rare earth element oxide, usually in order to stabilize the dispersion of the sol, inorganic acids such as nitric acid, hydrochloric acid and phosphoric acid, or salts thereof, and organic acids such as acetic acid, malic acid, ascorbic acid and lactic acid are used as dispersion stabilizing agents. Among these dispersion stabilizing agents, in particular, phosphoric acid is expected to, in the packaging material 10, (1) provide the stabilization of sol dispersion, (2) improve the adhesiveness to the metallic foil layer 13 by means of aluminum chelating ability of phosphoric acid, (3) impart the electrolytic solution resistance by trapping aluminum ions eluted under the influence of hydrofluoric acid (formation of passivated form), (4) improve the aggregation force of anti-corrosion treatment layer 14 (oxide layer) due to the fact that it tends to occur dehydration condensation of phosphoric acid at low temperatures, and the like.

Examples of the above phosphoric acid or a salt thereof include orthophosphoric acid, pyrophosphoric acid, metaphosphoric acid, or alkali metal salts and ammonium salts thereof. Among these, in order to express functions in the packaging material 10, condensed phosphoric acids such as trimetaphosphoric acid, tetrametaphosphoric acid, hexametaphosphoric acid and ultrametaphosphoric acid, or alkali metal salts and ammonium salts thereof are preferable. Also, in view of dry film formability (drying ability, heat quantity) when the anti-corrosion treatment layer 14 consisting of the rare earth element oxide is formed by a variety of coating processes using the above sol of the rare earth element oxide, sodium salts are more preferable due to the dehydration condensation ability of sodium salts at low temperatures. As phosphates, water soluble salts are preferable.

It is preferable that the mixing ratio of phosphoric acid (or a salt thereof) to the rare earth element oxide be 1 to 100 parts by mass per 100 parts by mass of the rare earth element oxide. When the above mixing ratio is 1 part by mass or more per 100 parts by mass of the rare earth element oxide, the sol of the rare earth element oxide become more stable, and the function of the packaging material 10 become better. It is more preferable that the above mixing ratio be 5 parts by mass or more per 100 parts by mass of the rare earth element oxide. Also, when the above mixing ratio is 100 parts by mass or less per 100 parts by mass of the rare earth element oxide, the function of the sol of the rare earth element oxide enhances, and the sol of the rare earth element oxide has good performance with regard to prevention of corrosion of the electrolytic solution. It is more preferable that the above mixing ratio be 50 parts by mass or less per 100 parts by mass of the rare earth element oxide, and it is further preferable that the above mixing ratio be 20 parts by mass or less.

The anti-corrosion treatment layer 14 formed by the above sol of the rare earth element oxide is an aggregate of inorganic particles, and therefore, even after undergoing a dry curing step, the aggregation force of this layer itself may be small. Therefore, it is preferable that the anti-corrosion treatment layer 14 in this case have been set to form a composite with the following anionic polymer or cationic polymer in order to supplement the aggregation force.

Examples of the anionic polymer include polymers having a carboxy group, such as poly(meth)acrylic acid (or a salt thereof), or a copolymer obtained by copolymerization of poly(meth)acrylic acids as a main component. Examples of the copolymerized components in this copolymer include alkyl (meth)acrylate-based monomer (as the alkyl group, methyl group, ethyl group, n-propyl group, i-propyl group, n-butyl group, i-butyl group, t-butyl group, 2-ethylhexyl group, cyclohexyl group, and the like.); amide group-containing monomers such as (meth)acrylamide, N-alkyl (meth) acrylamide, N,N-dialkyl (meth)acrylamide (as the alkyl group, methyl group, ethyl group, n-propyl group, i-propyl group, n-butyl group, i-butyl group, t-butyl group, 2-ethylhexyl group, cyclohexyl group and the like.), N-alkoxy (meth)acrylamide, N,N-dialkoxy(meth)acrylamide (as the alkoxy group, methoxy group, ethoxy group, butoxy group, isobutoxy group, and the like.), N-methylol (meth)acrylamide, and N-phenyl(meth)acrylamide; hydroxy group-containing monomers such as 2-hydroxyethyl(meth)acrylate and 2-hydroxypropyl(meth)acrylate; glycidyl group-containing monomers such as glycidyl(meth)acrylate and allyl glycidylether; silane-containing monomers such as (meth)acryloxypropyltrimethoxysilane, (meth)acryloxypropyltriethoxysilane; and isocyanate group-containing monomers such as (meth)acryloxypropylisocyanate.

These anionic polymers play a role in improving the stability of the anti-corrosion treatment layer 14 (oxide layer) obtained by using the sol of the rare earth element oxide. This role is accomplished by the effect of protecting a hard but brittle oxide layer with an acrylic-based resin component, and the effect of trapping (cation trapping) an ion contaminant (in particular, a sodium ion) derived from a phosphate included in the sol of the rare earth element oxide. In short, when alkali metal ions and alkali earth metal ions such as sodium ions in particular are included in the anti-corrosion treatment layer 14 obtained by using the sol of the rare earth element oxide, the anti-corrosion treatment layer 14 tends to degrade with a site including these ions as an origin of the degradation. As a result of this, the resistance of the anti-corrosion treatment layer 14 enhances by immobilizing sodium ions and the like included in the sol of the rare earth element oxide due to the anionic polymer.

The anti-corrosion treatment layer 14 in which the anionic polymer and the sol of the rare earth element oxide are combined has anti-corrosion performance equivalent to that of an anti-corrosion treatment layer 14 formed by subjecting an aluminum foil to chromate treatment. It is preferable that the anionic polymer have a structure in which polyanionic polymers, which are essentially water-soluble, are cross-linked. Examples of the crosslinking agent for forming this structure include compounds having an isocyanate group, a glycidyl group, a carboxy group, and an oxazoline group.

Examples of the compound having an isocyanate include diisocyanates such as tolylenediisocyanate, xylylene diisocyanate or hydrogenation products thereof, hexamethylenediisocyanate, 4,4'-diphenylmethanediisocyanate or hydrogenation products thereof, and isophoronediisocyanate; or polyisocyanates such as adducts prepared by reacting these isocyanates with polyhydric alcohols such as trimethylolpropane, biurets obtained by reacting these isocyanates with water, or trimeric isocyanurates; or blocked polyisocyanates prepared by blocking these polyisocyanates with alcohols, lactams, oximes and the like.

Examples of the compound having a glycidyl group include epoxy compounds obtained by reacting glycols such as ethylene glycol, diethylene glycol, triethylene glycol, polyethylene glycol, propylene glycol, dipropylene glycol, tripropylene glycol, polypropylene glycol, 1,4-butanediol, 1,6-hexanediol and neopentylglycol with epichlorohydrin; epoxy compounds obtained by reacting polyhydric alcohols such as glycerin, polyglycerin, trimethylolpropane, pentaerythritol and sorbitol with epichlorohydrin; and epoxy compounds obtained by reacting dicarboxylic acids such as phthalic acid, terephthalic acid, oxalic acid and adipic acid with epichlorohydrin.

Examples of the compound having a carboxy group include a variety of aliphatic or aromatic dicarboxylic acids. Also, it is possible to use poly(meth)acrylic acids and alkali (earth) metal salts of poly(meth)acrylic acids.

Examples of the compound having an oxazoline group include low molecular compounds having two or more oxazoline units, or when using polymerizable monomers such as isopropenyl oxazoline, compounds copolymerized with acrylic-based monomers such as (meth)acrylic acid, alkyl (meth)acrylate esters and hydroxyalkyl (meth)acrylate.

Also, it is possible to react an anionic polymer and a silane coupling agent, more specifically, selectively react a carboxy group of the anionic polymer and a functional group of the silane coupling agent to achieve a crosslinking point as a siloxane bond. In this case, it is possible to use γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, vinyltrichlorosilane, γ-mercaptopropyltrimethoxysilane, γ-aminopropyltriethoxysilane, N-β(aminoethyl)-γ-aminopropyltrimethoxysilane, γ-isocyanatopropyltriethoxysilane, and the like. Among these, in view of reactivity with an anionic polymer or a copolymer thereof in particular, epoxy silane, aminosilane and isocyanate silane are preferable.

It is preferable that the ratio of these crosslinking agents to the anionic polymer be 1 to 50 parts by mass per 100 parts by mass of the anionic polymer, and it is more preferable that this ratio be 10 to 20 parts by mass. When this ratio of the crosslinking agent is 1 part by mass or more per 100 parts by mass of the anionic polymer, the crosslinked structure tends to be formed satisfactorily. When the ratio of the crosslinking agent is 50 parts by mass or less per 100 parts by mass of the anionic polymer, pot life of the coating solution increases.

The process for crosslinking the anionic polymers is not limited to the above crosslinking agent, and may be a process for forming crosslinking of ions by using a titanium compound or a zirconium compound.

Examples of the cationic polymer include polymers having an amine, and examples of the polymers having an amine include polyethyleneimine, ionic macromolecular complex consisting of polyethyleneimine and polymers having a carboxylic acid, primary amine grafted acrylic resins obtained by grafting a primary amine onto an acrylic main backbone, polyallylamine, or derivatives thereof, and cationic polymers such as aminophenol.

It is preferable to use the cationic polymer in combination with a crosslinking agent having a functional group reactive with amine/imine such as a carboxy group and a glycidyl group. As the crosslinking agent used in combination with the cationic polymer, it is possible to use polymers having a carboxylic acid that forms ionic macromolecular complex with polyethyleneimine, and examples of these polymers include polycarboxylic acids (salts) such as polyacrylic acids or ionic salts thereof, or copolymers prepared by introducing comonomers in these polycarboxylic acids (salts), and polysaccharides having a carboxy group such as carboxymethyl cellulose or ionic salts thereof. Examples of the polyallylamine include homopolymers or copolymers of allylamines, allylamine amidosulfates, diallylamines, and dimethylallylamines. These amines can be free amines, or can be those stabilized by acetic acid or hydrochloric acid. Also, as the copolymerized components, it is possible to use maleic acid, sulfur dioxide, and the like. In addition, it is possible to use amines imparted with heat crosslinking ability by subjecting primary amine to partial methoxylation, and it is also possible to use aminophenol. In particular, allylamine or derivatives thereof is preferable.

In the present embodiment, the cationic polymer is described as one constituent constituting the anti-corrosion treatment layer 14. The reason is that, as a result of diligent studies that have been made by means of various compounds in order to impart electrolytic solution resistance and hydrofluoric acid resistance required for a packaging material for a power storage device, it has been found that the cationic polymer itself is a compound that can impart electrolytic solution resistance and hydrofluoric acid resistance. The factor contributing to this is speculated to be the fact that damage of the aluminum foil is suppressed by trapping fluorine ions with cationic groups (anion trap).

The cationic polymer is more preferable material in view of improvement in adhesiveness. Also, the cationic polymer is water soluble in a manner analogous to the above anionic polymer, and it is therefore more preferable to form a crosslinked structure in the cationic polymer to impart water resistance to the cationic polymer. As a crosslinking agent for forming a crosslinked structure in the cationic polymer, it is possible to use the crosslinking agents illustrated in the section with regard to the anionic polymer. When the sol of the rare earth element oxide is used as the anti-corrosion treatment layer 14, the cationic polymer can be used as a protective layer of the anti-corrosion treatment layer 14, instead of using the above anionic polymer.

The anti-corrosion treatment layer resulting from the chemical conversion treatment represented by the chromate treatment is obtained by, in order to form an inclined structure in relation to the aluminum foil, treating an aluminum foil with a chemical conversion treating agent to which hydrofluoric acid, hydrochloric acid, nitric acid, sulphuric acid or salts thereof is mixed in particular, followed by reacting the aluminum foil with chromium-based or non-chromium-based compound to form a chemical conversion-treated layer on the aluminum foil. However, the above chemical conversion treatment uses acids as chemical conversion treating agents, and as a result of this, involves degradation of working conditions or corrosion in the coating device. On the other hand, in contrast to chemical conversion treatment represented by the chromate treatment, the above-described anti-corrosion treatment layer 14 of a coating type is not required to form an inclined structure in relation to the metallic foil layer 13 using the aluminum foil. Therefore, the nature of the coating agent is not limited with regard to acidic properties, alkaline properties, neutral properties and the like, and it is possible to accomplish good working conditions. In addition, due to the fact that alternative solution to the chromate treatment using a chromium compound is demanded in view of environmental sanitation, the anti-corrosion treatment layer 14 of the coating type is preferable.

In view of the content of the above description, combination examples of the above-described anti-corrosion treatment of the coating type include (1) the sol of the rare earth element oxide alone, (2) the anionic polymer alone, (3) the cationic polymer alone, (4) the sol of the rare earth element oxide+the anionic polymer (the formation of a composite by laminating), (5) the sol of the rare earth element oxide+the cationic polymer (the formation of a composite by laminating), (6) (the sol of the rare earth element oxide+the anionic polymer: the formation of a composite by laminating)/the cationic polymer (multilayering), (7) (the sol of the rare earth element oxide+the cationic polymer: the formation of a composite by laminating)/the anionic polymer (multilayering). Among these, (1) and (4) to (7) are preferable, (4) to (7) are particularly preferable. In this regard, the present embodiment is not limited to the above combinations. For example, as examples of the selection of anti-corrosion treatment, the cationic polymer is a very preferable material in view of the fact that the cationic polymer has good adhesiveness to a modified polyolefin resin illustrated in the description of the adhesive resin layer or the adhesive layer (second adhesive layer) described below, and therefore, in a case where the adhesive resin layer or the adhesive layer is configured with the modified polyolefin resin, it is possible to accomplish a design such that the cationic polymer is disposed on a face in contact with the adhesive resin layer or the adhesive layer (for example, a configuration such as configurations (5) and (6)).

Also, the anti-corrosion treatment layer 14 is not limited to the above-described layers. For example, in a manner analogous to as in chromate of an application type of known technology, it is possible to form the anti-corrosion treatment layer 14 by using a treating agent prepared by mixing phosphoric acid and a chromium compound into a resin binder (such as aminophenol). By means of this treating agent, it is possible to provide a layer with both anti-corrosion function and adhesiveness. Also, although stability of the coating solution has to be taken into consideration, by means of a coating agent in which a sol of a rare earth element oxide and an polycationic polymer or polyanionic polymer have been set to be a one-component in advance, it is possible to provide a layer with both the anti-corrosion function and the adhesiveness.

In either a multilayered structure or a single-layered structure, it is preferable that the mass of the anti-corrosion treatment layer 14 per unit area be 0.005 to 0.200 g/m$^2$, and it is more preferable that this mass be 0.010 to 0.100 g/m$^2$. When the above-described mass per unit area is 0.005 g/m$^2$ or more, it is easy to impart the anti-corrosion function to the metallic foil layer 13. Also, even when the above-described mass per unit area is greater than 0.200 g/m$^2$, the anti-corrosion function does not vary to a significant extent. On the other hand, in a case where the sol of the rare earth element oxide is used, curing by heat in drying is insufficient when the coating is thick, and decrease in aggregation force may occur. Note that the thickness of the anti-corrosion treatment layer 14 can be calculated from the specific gravity thereof.

In view of further suppressing the decrease in electrolytic solution laminating strength, and further suppressing the decrease in insulation properties after heat sealing, after molding and after degassing heat sealing, the anti-corrosion treatment layer 14 can be, for example, such that it includes cerium oxide, 1 to 100 parts by mass of phosphoric acid or a phosphate per 100 parts by mass of the cerium oxide, and a cationic polymer, can be such that it is formed by subjecting the metallic foil layer 13 to the chemical conversion treatment, or can be such that it is formed by subjecting the metallic foil layer 13 to the chemical conversion treatment, and includes a cationic polymer.

<Adhesive Resin Layer 15>

The adhesive resin layer 15 generally configured by comprising an adhesive resin composition as a main component, and where appropriate, an additive component. Also, it is preferable that the adhesive resin layer 15 comprise an additive compound of which an SP value is 11.0 (cal/cm$^3$)$^{1/2}$ or more and 20.0 (cal/cm$^3$)$^{1/2}$ or less. Details with regard to this additive compound will be described below. Although the adhesive resin composition is not limited in particular, it is preferable that the adhesive resin composition contains a modified polyolefin resin (a) component and a macro-phase separated thermoplastic elastomer (b) component. Also, it is preferable that the additive component include polypropylene with an atactic structure, or propylene-α-olefin copolymer with an atactic structure (c). Each of these components will be described below.

(Modified Polyolefin Resin (a))

It is preferable that the modified polyolefin resin (a) be a resin in which an unsaturated carboxylic acid derivative component derived from any of an unsaturated carboxylic acid, an acid anhydride of an unsaturated carboxylic acid and an ester of an unsaturated carboxylic acid is graft-modified to a polyolefin resin.

Examples of the polyolefin resin include polyolefin resins such as low density polyethylene, medium density polyethylene, high density polyethylene, an ethylene-α-olefin copolymer, a homo-, block or random polypropylene, and a propylene-α-olefin copolymer. Among these, the polypropylene-based resin is preferable in view of heat resistance, and in view of fundamental performance of the packaging material such as heat seal strength, the random polypropylene is more preferable.

Examples of a compound for use in graft modification of these polyolefin resins include an unsaturated carboxylic acid derivative component derived from any of an unsaturated carboxylic acid, an acid anhydride of an unsaturated carboxylic acid, and ester of an unsaturated carboxylic acid.

Specific examples of the unsaturated carboxylic acid include acrylic acid, methacrylic acid, maleic acid, fumaric acid, itaconic acid, citraconic acid, tetrahydrophthalic acid, and bicyclo[2,2,1]hept-2-en-5,6-dicarboxylic acid.

Examples of the acid anhydride of the unsaturated carboxylic acid include acid anhydride of an unsaturated carboxylic acid such as maleic anhydride, itaconic anhydride, citraconic anhydride, tetrahydrophthalic anhydride, and bicyclo[2,2,1]hept-2-en-5,6-dicarboxylic anhydride.

Examples of the ester of the unsaturated carboxylic acid include ester of an unsaturated carboxylic acid such as methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate anhydride, and dimethyl bicyclo[2,2,1]hept-2-en-5,6-dicarboxylate.

The modified polyolefin resin (a) can be produced by subjecting 0.2 to 100 parts by mass of the unsaturated carboxylic acid derivative component described above per 100 parts by mass of the polyolefin resin as a base component to graft polymerization (graft modification) under the presence of a radical initiator. It is preferable that the reaction temperature of the graft modification be 50 to 250° C., and it is more preferable that it be 60 to 200° C. Also, the reaction time is appropriately set depending on the production method, and for example, in a case of melt graft polymerization by a twin-screw extruder, it is preferable that the reaction time be within the residence time in the extruder, and specifically 2 to 30 minutes, and it is more preferable that the reaction time be 5 to 10 minutes. Note that the graft modification can be conducted under conditions of either normal pressure or with pressurization.

Examples of the radical initiator for use in the graft modification include organic peroxide such as alkyl peroxide, aryl peroxide, acyl peroxide, ketone peroxide, peroxyketal, peroxycarbonate, peroxyester, and hydroperoxide.

It is possible to appropriately select and use the organic peroxide depending on conditions with regard to the reaction temperature and the reaction time described above. For example, in a case of melt graft polymerization with a twin-screw extruder, alkyl peroxide, peroxyketal, and peroxyester are preferable, and specifically, di-t-butyl peroxide, 2,5-dimethyl-2,5-di-t-butylperoxy-hexin-3, dicumyl peroxide and the like are preferable.

As the modified polyolefin resin (a), polyolefin resins modified with maleic anhydride are preferable, and for example, "ADMER" manufactured by Mitsui Chemicals Inc. and "MODIC" manufactured by Mitsubishi Chemical Corporation and the like are suitable. Such a modified polyolefin resin (a) component has good reactivity with polymers having a variety of metals and a variety of functional groups, and it is therefore possible to impart the adhesiveness to the adhesive resin layer 15 using this reactivity, and to improve the electrolytic solution resistance.

(Macro-Phase Separated Thermoplastic Elastomer (b))

The macro-phase separated thermoplastic elastomer (b) forms a macro-phase separated structure in which the disperse phase size is in a range of greater than 200 nm and less than or equal to 50 μm in relation to the modified polyolefin resin (a).

Due to the fact that the adhesive resin composition contains the macro-phase separated thermoplastic elastomer (b) component, it is possible to release residual stress generated when laminating the modified polyolefin resin (a) component that is a main component constituting the adhesive resin layer 15, and it is possible to impart the viscoelastic adhesiveness to the adhesive resin layer 15. As a result of this, the adhesiveness of the adhesive resin layer 15 further enhances to obtain a packaging material 10 having better electrolytic solution resistance.

The macro-phase separated thermoplastic elastomer (b) is present in the form of a sea-island structure in the modified polyolefin resin (a); however, when the disperse phase size is 200 nm or less, it is difficult to impart the improvement in viscoelastic adhesiveness. On the other hand, when the disperse phase size is greater than 50 μm, since the modified polyolefin resin (a) and the macro-phase separated thermoplastic elastomer (b) are essentially incompatible with each other, the laminating suitability (processability) significantly decreases, and in addition, the physical strength of the adhesive resin layer 15 tends to decrease. In view of the above-mentioned facts, it is preferable that the disperse phase size be 500 nm to 10 μm.

Examples of such a macro-phase separated thermoplastic elastomer (b) include a polyolefin-based thermoplastic elastomer in which ethylene and/or propylene are copolymerized with an α-olefin selected from 1-butene, 1-pentene, 1-hexene, 1-octene and 4-methyl-1-pentene.

Also, as the macro-phase separated thermoplastic elastomer (b) component, it is possible to use commercially available products, and for example, "TAFMER" manufactured by Mitsui Chemicals Inc., "ZELAS" manufactured by Mitsubishi Chemical Corporation, "Catalloy" manufactured by Montell and the like are suitable.

In the adhesive resin layer 15, it is preferable for the content of the macro-phase separated thermoplastic elastomer (b) component to the modified polyolefin resin (a) component in the adhesive resin composition to be 1 to 40 parts by mass per 100 parts by mass of the modified polyolefin resin (a) component, and it is more preferable for this content to be 5 to 30 parts by mass. Here, when the content of the macro-phase separated thermoplastic elastomer (b) component is less than 1 part by mass, the adhesiveness of the adhesive resin layer is not expected to enhance. On the other hand, when the content of the macro-phase separated thermoplastic elastomer (b) component is greater than 40 parts by mass, the modified polyolefin resin (a) component and the macro-phase separated thermoplastic elastomer (b) component have low compatibility with each other by nature, and therefore, the processability tends to decrease significantly. Also, the macro-phase separated thermoplastic elastomer (b) component is not a resin exhibiting adhesiveness, and therefore, the adhesiveness of the adhesive resin layer 15 to other layers such as the sealant layer 16 and the anti-corrosion treatment layer 14 tends to decrease.

(Polypropylene with Atactic Structure or Propylene-α-Olefin Copolymer with Atactic Structure (c))

It is preferable that the adhesive resin layer 15 include polypropylene with an atactic structure or a propylene-α-olefin copolymer with an atactic structure (hereinafter, merely referred to as "component (c)") as an additive component. Here, the component (c) is a fully amorphous resin component.

Hereinafter, an effect of adding the additive component (c) to an adhesive resin composition as a main component in the adhesive resin layer 15 will be described.

When the adhesive resin layer 15 is in a melted state, the component (c) is compatible with the modified polyolefin resin (a) component in the adhesive resin composition; however, the component (c) is discharged out of the crystal during crystallization involved in cooling, and is homogeneously dispersed around spherulites. As a result of this, the component (c) does not disturb the degree of crystallinity of the modified polyolefin resin (a) component in the adhesive resin composition as a main component. Also, by adding the component (c) in the adhesive resin layer 15, the concentration of the modified polyolefin resin (a) component is reduced by dilution due to the component (c) to suppress the crystal growth, and as a result of this, it is possible to reduce the crystal size (spherulite size) of the adhesive component of the base resin (in other words, the modified polyolefin resin (a) component). Also, the component (c) discharged out of the crystal is homogeneously dispersed around minute spherulites of the modified polyolefin resin (a) component.

Here, it is conventionally known that "whitening phenomenon" generates in cold molding of packaging materials. Here, the mechanism of whitening phenomenon will be illustrated.

(1) As a result of heat treatment in heat lamination, the modified polyolefin resin (a) in the adhesive resin layer 15 is crystallized.
(2) The modified polyolefin resin (a) and the macro-phase separated thermoplastic elastomer (b) are incompatible with each other, and as a result of this, strain occurs at the interface between the both by behavior of the crystallization in (1).
(3) Due to the application of stress in molding, cracks occur at the interface between the both, and as a result of this, voids and crazes are formed.
(4) Light is scattered due to voids and crazes to occur whitening phenomenon by irregular reflection of optical light.

In other words, it is known that "the fact that the crystallization of the modified polyolefin resin (a) is not to proceed by heat quantity provided in heat lamination, or the fact that, even when the crystallization proceeds, minute spherulites are formed", and "the fact that the adhesiveness between the modified polyolefin resin (a) and the macro-phase separated thermoplastic elastomer (b) is to be improved" are important in order to suppress the whitening phenomenon.

By contrast to this, it is possible to reduce the crystal size (spherulite size) of the modified polyolefin resin (a) component by adding the component (c) as an additive component to the adhesive resin composition that is a main component of the adhesive resin layer 15, and as a result of this, properties of flexible and tough film are achieved. Also, it is considered that, as a result of the fact that the component (c) is homogeneously dispersed around the modified polyolefin resin (a), it is possible to relax stress homogeneously, and suppress the generation of voids and crazes, and it is therefore possible to reduce the "whitening phenomenon" of the packaging material 10 due to stress in molding.

As described above, by adding the component (c) as an additive component to the adhesive resin composition that is a main component of the adhesive resin layer 15, it is possible to increase the transparency of the adhesive resin layer 15, and in addition, to reduce the whitening phenomenon due to stress in molding. As a result of this, the molding whitening is also improved to enable improvement in insulation properties (flex resistance) due to bending stress of the packaging material 10. Also, this enables the impartment of flexibility with retaining the degree of crystallinity of the modified polyolefin resin component (a) in the adhesive resin layer 15, and it is therefore possible to suppress the decrease in laminating strength during swelling of the electrolytic solution of the packaging material 10.

(Propylene-α-Olefin Copolymer (d) of Isotactic Structure)

In addition to the above-described component (c), it is preferable that the adhesive resin layer 15 further include a propylene-α-olefin copolymer of isotactic structure (hereinafter, merely referred to as "component (d)") as an additive component.

By further adding the component (d) as an additive component to the adhesive resin component as a main component of the adhesive resin layer 15, it is possible to impart flexibility for relaxing stress, and as a result of this, it is possible to improve the heat seal strength (in particular, the electrolytic solution resistance), and improve degassing seal strength with suppressing the decrease in electrolytic solution laminating strength. Also, by combining the component (c) and the component (d) as additive components, it is possible to further improve the whitening phenomenon, the flex resistance insulation properties.

It is preferable that the proportion of the additive component in the adhesive resin layer 15 (in other words, the total amount of the component (c) and the component (d)) be 5 to 40% by mass. Here, when the proportion of the additive component in the adhesive resin layer 15 is less than 5% (in other words, when the proportion of the adhesive resin composition is greater than 95% by mass), effects due to the addition of the additives as described above tend not to be obtained satisfactorily. On the other hand, when the proportion of the additive component in the adhesive resin layer 15 is greater than 40% by mass (in other words, when the proportion of the adhesive resin composition is less than 60% by mass), the adhesiveness of the adhesive resin layer 15 to other layers such as the sealant layer 16 and the anti-corrosion treatment layer 14 tends to decrease.

Note that, as a method for analyzing the component (c) as an additive component in the adhesive resin layer 15, for example, it is possible to conduct quantification by evaluation of tacticity by nuclear magnetic resonance spectroscopy (NMR).

On the other hand, with regard to analysis of the component (d), it is possible to produce a calibration curve with the absorption band attributed to the branching of α-olefin, and the absorption band attributed to the characteristic absorption band of the modified polyolefin resin (a) by means of Fourier transform infrared spectroscopy (FT-IR), and as a result of this, it is possible to identify the mixing ratio.

In addition to the adhesive resin compositions (in other words, the modified polyolefin resin (a) component, and the macro-phase separated thermoplastic elastomer (b) component) and the additive components (in other words, the component (c), and the component (d)), the adhesive resin layer 15 can contain a variety of additives such as flame retardants, slip agents, anti-blocking agents, antioxidants, light stabilizers and tackifiers, where appropriate.

The thickness of the adhesive resin layer 15 is not limited in particular; however, in view of relaxation of stress and in view of permeation of moisture and electrolytic solution, it is preferable that the thickness of the adhesive resin layer 15 be equal to that of the sealant layer 16 (for example, 5 to 100 µm, or 10 to 60 µm, or 30 µm or less) or less than that of the sealant layer 16.

<Sealant Layer 16>

The sealant layer 16 is a layer imparting sealability resulting from heat sealing to the packaging material 10, and a layer disposed on the inner side when a power storage device is assembled, to be subjected to thermal fusion. It is preferable that, as a base resin, the sealant layer 16 include a polyolefin-based resin, or an acid-modified polyolefin-based resin obtained by subjecting a polyolefin-based resin to graft modification with an acid such as maleic anhydride. Among these, as the base resin, a polyolefin-based resin that improves steam barrier properties, and that can be in the form of a power storage device without becoming excessively flat by heat sealing is preferable, and in view of heat resistance, a polypropylene-based resin is more preferable, and in view of fundamental performance of the packaging material such as heat seal strength, a random polypropylene is more preferable. Also, it is preferable that the sealant layer 16 comprise an additive compound of which an SP value is 11.0 $(cal/cm^3)^{1/2}$ or more and 20.0 $(cal/cm^3)^{1/2}$ or less. Details with regard to this additive compound will be described below.

Examples of the polyolefin-based resin include low density, medium density and high density polyethylene; an ethylene-α-olefin copolymer; polypropylene; and a propylene-α-olefin copolymer. The polyolefin resin as a copolymer can be a block copolymer, or a random copolymer. It is possible to use one of these polyolefin-based resins alone, or to use two or more thereof in combination.

When the base resin comprises the polypropylene-based resin, the sealant layer 16 may comprise at least one of a compatible elastomer having compatibility with the polypropylene-based resin, and an incompatible elastomer not having compatibility with the polypropylene-based resin. Each of the components will be described below.

(Polypropylene-Based Resin)

Examples of the polypropylene-based resin include a propylene homopolymer (homopolypropylene), a propylene-ethylene block copolymer (block polypropylene), a propylene-ethylene random copolymer (random polypropylene), and a copolymer of an α-olefin other than ethylene and propylene with a propylene (propylene-based copolymer). It is possible to use one of these alone, or to use two or more thereof in combination.

Specific examples of the α-olefin as monomers constituting the above propylene-based copolymer include 1-butene, 1-pentene, 3-methyl-1-butene, 1-hexene, 3-methyl-1-pentene, and 4-methyl-1-pentene.

it is preferable that the polypropylene-based resin be homopolypropylene or random polypropylene, and it is more preferable that the polypropylene-based resin be random polypropylene. By using the random polypropylene, it is possible to further improve deep drawability (moldability) and a variety of seal strengths, and in addition, it is possible to suppress the molding whitening. Also, the random polypropylene has better heat sealability at low temperatures than homopolypropylene and block polypropylene, and can improve the sealing properties in the case of involvement of the electrolytic solution.

In the random polypropylene, it is preferable that the content of ethylene be 0.1 to 10% by mass, it is more preferable that the content of ethylene be 1 to 7% by mass, and it is further preferable that the content of ethylene be 2 to 5% by mass. When the content of ethylene is 0.1% by mass or more, the effect of reducing the melting point by copolymerization of ethylene is satisfactorily achieved to enable further improvement in sealing properties in the case of involvement of the electrolytic solution, and in addition, to obtain the impact resistance, and it tends to enable improvement in sealing strength and molding whitening resistance. When the content of ethylene is 10% by mass or less, it tends to enable excessive decrease in melting point to be suppressed, and to enable generation of excessively sealed portions to be suppressed more satisfactorily. Note that the content of ethylene can be calculated from the mixing ratio of the monomers in polymerization.

It is preferable that the melting point of the random polypropylene be 120 to 145° C., and it is more preferable that the melting point of the random polypropylene be 125 to 140° C. When this melting point is 120° C. or more, it tends to enable generation of excessively sealed portions to be suppressed more satisfactorily. When the melting point is 145° C. or less, it tends to enable further improvement in sealing properties in the case of involvement of the electrolytic solution.

The random polypropylene may be acid-modified, and for example, can be an acid-modified propylene-ethylene random copolymer obtained by graft modification with maleic anhydride. By using the acid-modified propylene-ethylene random copolymer, it is possible to retain the adhesiveness to tab leads without a tab sealant.

With regard to the random polypropylene, it is possible to use one alone, or to use a combination of two or more thereof.

In the sealant layer 16, it is preferable that the content of the polypropylene-based resin be 60 to 95% by mass based on the total amount of the base resin, the compatible elastomer and the incompatible elastomer, it is more preferable that this content be 60 to 90% by mass, and it is further preferable that this content be 60 to 85% by mass. As a result of the fact that the content of the polypropylene-based resin is 60% by mass or more, it is possible to improve the sealing properties by an effect of using the polypropylene-based resin by nature. Also, it is possible to prevent excessive presence of the compatible elastomer and the incompatible elastomer by setting the content of the polypropylene-based resin to be 60% by mass or more, and therefore, it is possible to suppress the decrease in heat resistance of the sealant layer 16, and in addition, it is possible to suppress the generation of excessively sealed portions. On the other hand, due to the fact that inclusion of 5% by mass or more of the compatible elastomer and the incompatible elastomer can be achieved by setting the content of the polypropylene-based resin to be 95% by mass or less, it is possible to satisfactorily achieve the effect of improving the degassing heat seal strength due to the compatible elastomer and the incompatible elastomer.

(Compatible Elastomer)

The compatible elastomer is an elastomer having compatibility with the above polypropylene-based resin, and can impart flexibility to the sealant layer 16. By imparting flexibility to the sealant layer 16, it is possible to impart functions such as the molding whitening resistance and the impact resistance to the sealant layer 16. Also, by adding the compatible elastomer to the sealant layer 16, it is possible to improve the sealing properties in the case of involvement of the electrolytic solution including the degassing heat seal strength. Note that having compatibility (compatible) with the polypropylene-based resin means to provide dispersion in the polypropylene-based resin with a disperse phase size of 1 nm or more and less than 500 nm.

As the compatible elastomer, a compatible polyolefin-based elastomer is preferable due to the fact that the above-described effect is allowed to be obtained more sufficiently, and the propylene-α-olefin copolymer is more preferable. By using the propylene-α-olefin copolymer, it is possible to further improve the sealing properties in the case of involvement of the electrolytic solution such as the electrolytic solution laminating strength and the degassing heat seal strength.

As the propylene-α-olefin copolymer, it is possible to use a compound obtained by copolymerizing propylene with an α-olefin selected from 1-butene, 1-pentene, 1-hexene, 1-octene and 4-methyl-1-pentene. Among these, using a propylene-1-butene random copolymer obtained by copolymerization with 1-butene is particularly preferable in view of improvement in sealing properties and compatibility.

(Incompatible Elastomer)

The incompatible elastomer is an elastomer not having compatibility with the above polypropylene-based resin, and can impart the impact resistance and the low-temperature resistance to the sealant layer 16. Also, by adding the incompatible elastomer to the sealant layer 16, it is possible to improve the sealing properties in the case of involvement of the electrolytic solution including the degassing heat seal strength. Note that not having compatibility (incompatible) with the polypropylene-based resin means to provide dispersion in the polypropylene-based resin with a disperse phase size of 500 nm or more and less than 20 μm.

As the incompatible elastomer, an incompatible polyolefin-based elastomer is preferable, and an ethylene-α-olefin copolymer is more preferable due to the fact that the above-described effect is obtained more sufficiently. By using the ethylene-α-olefin copolymer, it is possible to further improve the sealing properties in the case of involvement of the electrolytic solution such as the electrolytic solution laminating strength and the degassing heat seal strength.

As the ethylene-α-olefin copolymer, it is possible to use a compound obtained by copolymerizing ethylene with an α-olefin selected from 1-butene, 1-pentene, 1-hexene, 1-octene and 4-methyl-1-pentene. Among these, using an ethylene-1-butene random copolymer obtained by copolymerization with 1-butene is particularly preferable in view of improvement in sealing properties.

It is possible to use one of the compatible elastomer and the incompatible elastomer alone, or to use two or more thereof in combination.

It is preferable that the melting points of the compatible elastomer and the incompatible elastomer be 150° C. or less, and in view of suppressing the excessively sealed portion, suppressing the molding whitening, and improving the sealing properties in the case of involvement of the electrolytic solution, it is more preferable that the melting points be 60 to 120° C., and it is further preferable that the melting points be 65 to 90° C. As a result of the fact that this melting point is 150° C. or less, it is possible to improve the sealing properties in the case of involvement of the electrolytic solution, in particular, the degassing heat seal strength. Also, when this melting point is 60° C. or more, it is advantageous in view of suppressing the generation of the excessively sealed portions.

The sealant layer 16 can contain only one of the two elastomers that are compatible and incompatible described above; however, it is preferable that the sealant layer 16 contain both the compatible and incompatible elastomers because, as a result of this, it is possible to improve the molding whitening resistance and the sealing properties in the case of involvement of the electrolytic solution in a balanced manner. In particular, the affinity between the polypropylene-based resin, the propylene-1-butene random copolymer as a compatible elastomer, and the ethylene-1-butene random copolymer as an incompatible elastomer is good, and therefore, by using a combination thereof, it is possible to improve the molding whitening resistance and the sealing properties in the case of involvement of the electrolytic solution in more balanced manner.

In the sealant layer 16, it is preferable that the total content of the compatible elastomer and the incompatible elastomer be 5 to 40% by mass based on the total amount of the base resin, the compatible elastomer and the incompatible elastomer, it is more preferable that this total content be 10 to 40% by mass, and it is further preferable that this total content be 15 to 40% by mass. Due to the fact that the total content of the compatible elastomer and the incompatible elastomer is 5% by mass or more, it is possible to satisfactorily achieve the effect of improving the sealing properties in the case of involvement of the electrolytic solution, in particular, the degassing heat seal strength. On the other hand, by setting the total content of the compatible elastomer and the incompatible elastomer to be 40% by mass or less, it is possible to suppress the decrease in heat resistance of the sealant layer 16, and in addition, suppress the generation of the excessively sealed portions.

When the sealant layer 16 includes both the two elastomers that are compatible and incompatible, it is preferable that the ratio of both the contents (compatible elastomer/incompatible elastomer) be 0.5 to 3 based on the mass ratio, and it is more preferable that the ratio of both the contents be 1 to 2. By setting the ratio of the contents to be in the above range, it is possible to improve the molding whitening resistance and the sealing properties in the case of involvement of the electrolytic solution in a well-balanced manner (Components to be Added)

The sealant layer 16 can further include other components other than the polypropylene-based resin, the compatible elastomer and the incompatible elastomer described above. As the other components, it is possible to add, for example, other resins such as LDPE (low density polyethylene) in order to improve take-up easiness and processability. It is preferable that the content of the other resin components to be added be 10 parts by mass or less when the total mass of the sealant layer 16 is regarded as 100 parts by mass. Also, examples of components other than resins include slip agents, anti-blocking agents, antioxidants, light stabilizers, and flame retardants. It is preferable that the content of the other component other than resins be 5 parts by mass or less when the total mass of the sealant layer 16 is regarded as 100 parts by mass.

In the sealant layer 16, it is possible to identify the presence of 1-butene by attribution using FT-IR (Fourier transform infrared spectrophotometer). Also, it is possible to identify the content of 1-butene by producing a calibration curve with regard to transmittance or absorbance in characteristic absorption bands of the polypropylene-based resin and the elastomers by using a resin composition in which a known amount of elastomers including a known amount of 1-butene are mixed. In addition, it is possible to identify the content of 1-butene in each of the compatible elastomer and the incompatible elastomer by conducting imaging also in characteristic absorption band of FT-IR, and conducting the mapping of absorption band resulting from 1-butene by using microscopic FT-IR (transmission method). Note that in addition to FT-IR, it is possible to identify the presence and the content of 1-butene by dissolving the sealant layer 16 in a solvent, and measuring the sealant layer 16 by NMR.

Although the thickness of the sealant layer 16 is not limited in particular, it is preferable that the thickness of the sealant layer 16 be, for example, in a range of 5 to 100 μm, and it is more preferable that the thickness of the sealant layer 16 be in a range of 10 to 60 μm. Also, the thickness of the sealant layer 16 may be 30 μm or less in view of thinning. Also, the total thickness of the sealant layer 16 and the adhesive resin layer 15 (in other words, the total thickness of layers located at the inner side with respect to the metallic foil layer 13 on which the anti-corrosion treatment layer 14 is disposed) may be 35 μm or less. Even in such a thin film configuration, the packaging material for a power storage device of the present embodiment can suppress the decrease in insulation properties after degassing heat sealing.

<Additive Compound>

In the packaging material for a power storage device of the present embodiment, at least one layer of the adhesive resin layer 15 and the sealant layer 16 described above comprises a polyolefin-based resin, and an additive compound of which an SP value is 11.0 $(cal/cm^3)^{1/2}$ or more and 20.0 $(cal/cm^3)^{1/2}$ or less. By adding the additive compound to at least one layer of the adhesive resin layer 15 and the sealant layer 16, it is possible to express the effect of suppressing the decrease in insulation properties after degassing heat sealing; however, due to the fact that prevention of the destruction of a layer closer to the metallic foil layer 13 is effective for maintaining the insulation properties, it is preferable to add the additive compound to at least the adhesive resin layer 15, and in view of further suppressing the decrease in insulation properties after degassing heat sealing, it is more preferable to add the additive compound to both the adhesive resin layer 15 and the sealant layer 16.

When the SP value of the additive compound is 11.0 $(cal/cm^3)^{1/2}$ or more, the adhesive resin layer 15 and/or the sealant layer 16 tend not to be swelled with the electrolytic solution, and the destruction of the adhesive resin layer 15 and/or the sealant layer 16 by degassing heat sealing is prevented, and it is possible to suppress the decrease in insulation properties after degassing heat sealing. When the SP value of the additive compound is 20.0 $(cal/cm^3)^{1/2}$ or less, the dispersibility of the additive compound in the polyolefin-based resin is good, and the fundamental performance of the packaging material such as the laminating strength and the heat seal strength becomes good. When the SP value of the additive compound is greater than 20.0 $(cal/cm^3)^{1/2}$, the dispersibility of the additive compound in the polyolefin-based resin becomes poor, and as a result of this, the phase separation tends to occur, and in addition, the additive compound tends to undergo bleeding out, and therefore, swelling reducing effects with regard to the electrolytic solution become weaker, and in addition, the electrolytic solution laminating strength or the electrolytic solution heat sealing strength. Note that, when the polyolefin-based resin is a polypropylene-based resin, the SP value thereof is about 8.0. Also, in the case of the electrolytic solution using a carbonate-based solvent, the SP value of the electrolytic solution is 8.0 to 10.0. In contrast to these, by adjusting the SP value of the additive compound to be within the above range, it is possible to establish both the dispersibility in the polypropylene-based resin, and swelling resistance with regard to the electrolytic solution at high level. In view of achieving the above effect more sufficiently, it is more preferable that the SP value of the additive compound be 11.5 $(cal/cm^3)^{1/2}$ or more and 14.0 $(cal/cm^3)^{1/2}$ or less.

In the present invention, it is possible to determine the SP value of the additive compound by the following method. First of all, the additive compound is extracted with an organic solvent from the adhesive resin layer 15 and/or the sealant layer 16. With regard to the extracted additive compound, analysis and identification are conducted by infrared spectroscopy (IR), gas chromatography (GC), gas chromatography-mass spectroscopy (GC-MS) or the like. The SP value is calculated from the identified structural formula of the additive compound by an estimation method of Fedors (the following formula (A)):

$$\delta(SP \text{ value}) = [\Sigma E_{coh}/\Sigma V]^{1/2} \quad (A)$$

wherein $\tau E_{coh}$ [cal/mol] represents cohesive energy, and $\Sigma V$[cm³/mol] represents molecular volume in mole, and the unit of the SP value is $(cal/cm^3)^{1/2}$. Also with regard to $E_{coh}$ and V, it is possible to use values proposed by Fedors.

It is preferable that the difference between the SP value of the additive compound, and the SP value of the electrolytic solution used in power storage devices be 2.0 $(cal/cm^3)^{1/2}$ or more, and it is more preferable that this difference be 3.0 $(cal/cm^3)^{1/2}$ or more. As a result of the fact that this difference between these SP values is 2.0 $(cal/cm^3)^{1/2}$ or more, it is possible to reduce the swelling of the adhesive resin layer 15 and/or the sealant layer 16 due to the electrolytic solution more sufficiently.

When the SP value is 11.0 $(cal/cm^3)^{1/2}$ or more and 20.0 $(cal/cm^3)^{1/2}$ or less, the additive compound can be used regardless of whether being of a low molecular weight or a high molecular weight. In view of dispersibility in the polyolefin-based resin and bleeding out resistance, the molecular weight of the additive compound may be 70 or more and 10000 or less, it is preferable that the molecular weight of the additive compound be 100 or more and 6000 or less, it is more preferable that the molecular weight of the additive compound be 200 or more and 5000 or less, it is further preferable that the molecular weight of the additive compound be 200 or more and 2000 or less, it is particularly preferable that the molecular weight of the additive compound be 200 or more and 1000 or less, and it is very preferable that the molecular weight of the additive compound be 300 or more and 500 or less. By setting the molecular weight of the additive compound to be the above lower limit value or higher, the bleeding out can tend not to occur, and by setting this molecular weight to be the above upper limit value or less, the dispersibility in the polyolefin-based resin can become good.

The additive compound is not limited in particular as long as the SP value is within the above range, and as the additive compound, it is possible to use a variety of organic compounds that are able to be dispersed in the polyolefin-based resin; however, it is preferable to use a compound having relatively polar functional groups or bonds such as carboxy groups, hydroxy groups, ester bonds, ether bonds and amide bonds. Among these, as the additive compound, it is more preferable to use at least one compound selected from the group consisting of sugar derivatives, phenol derivatives, amide-based compounds, copolymers of terpenoids and phenols, and hydroxy group-modified polyolefins, and it is further preferable to use at least one compound selected from sugar derivatives.

It is preferable that the content of the additive compound in the adhesive resin layer 15 and/or the sealant layer 16 be 0.1 to 30% by mass based on the total amount of the adhesive resin layer 15 or the sealant layer 16, it is more preferable that this content be 0.2 to 10% by mass, and it is further preferable that this content be 0.2 to 5% by mass. When this content is 0.1% by mass or more, a good swelling reducing effect is obtained and it tends to sufficiently suppress the decrease in insulation properties after degassing heat sealing, and when this content is 30% by mass or less, the fundamental performance of the packaging material such as the laminating strength and the heat seal strength tends to be able to be sufficiently maintained.

Although preferable embodiments of the packaging material for a power storage device of the present invention have been described above in detail, the present invention is not limited to such certain embodiments, and a variety of variations and modifications can be made within the scope of the present invention defined in the claims.

For example, FIG. 1 shows a case where an anti-corrosion treatment layer 14 is formed on a face on the side of an adhesive resin layer 15 of a metallic foil layer 13; however, the anti-corrosion treatment layer 14 may be formed on a face on the side of a first adhesive layer 12 of the metallic foil layer 13, or may be formed on both faces of the metallic foil layer 13. In a case where the anti-corrosion treatment layer 14 is formed on both faces of the metallic foil layer 13, a configuration for the anti-corrosion treatment layer 14 to be formed on the side of the first adhesive layer 12 of the metallic foil layer 13, and a configuration for the anti-corrosion treatment layer 14 to be formed on the side of the adhesive resin layer 15 of the metallic foil layer 13 may be the same as or different than each other.

Figure 2:
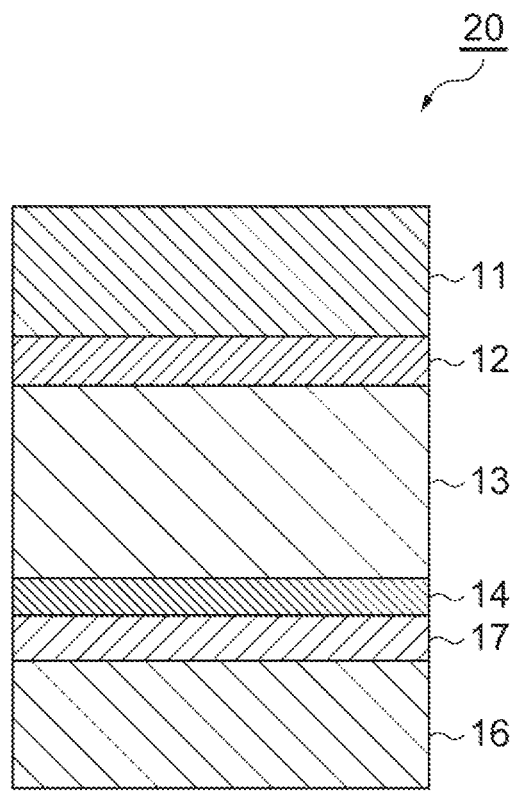
FIG. 2 is a schematic cross-sectional view of a packaging material for a power storage device according to one embodiment of the present invention.

Although, FIG. 1 shows a case where the metallic foil layer 13 and the sealant layer 16 are laminated by use of the adhesive resin layer 15, as in the packaging material for a power storage device 20 shown in FIG. 2, the metallic foil layer 13 and the sealant layer 16 may be laminated by use of the adhesive layer 17 (sometimes referred to as second adhesive layer 17). Hereinafter, the second adhesive layer 17 will be illustrated.

<Second Adhesive Layer 17>

The second adhesive layer 17 is a layer adhering the metallic foil layer 13 on which the anti-corrosion treatment layer 14 is formed, to the sealant layer 16. It is possible to use typical adhesive for adhering the metallic foil layer to the sealant layer in the second adhesive layer 17.

When the anti-corrosion treatment layer 14 has a layer including at least one polymer selected from the group consisting of the cationic polymers and the anionic polymers described above, it is preferable that the second adhesive layer 17 be a layer including a compound having reactivity with the above polymers included in the anti-corrosion treatment layer 14 (hereinafter, also referred to as "reactive compound").

For example, when the anti-corrosion treatment layer 14 includes a cationic polymer, the second adhesive layer 17 includes a compound having reactivity with the cationic polymer. When the anti-corrosion treatment layer 14 includes an anionic polymer, the second adhesive layer 17 includes a compound having reactivity with the anionic polymer. Also, when the anti-corrosion treatment layer 14 includes a cationic polymer and an anionic polymer, the second adhesive layer 17 includes a compound having reactivity with the cationic polymer, and a compound having reactivity with the anionic polymer. Here, the second adhesive layer 17 does not necessarily have to include the above two compounds, and may include a compound having reactivity with both the cationic polymer and the anionic polymer. Here, "having reactivity" means to form a covalent bond with a cationic polymer or an anionic polymer. Also, the second adhesive layer 17 can further include an acid-modified polyolefin resin.

Examples of the compound having reactivity with a cationic polymer include at least one compound selected from the group consisting of a multifunctional isocyanate compound, a glycidyl compound, a compound having a carboxy group and a compound having an oxazoline group.

Examples of the multifunctional isocyanate compound, the glycidyl compound, the compound having a carboxy group and the compound having an oxazoline group include the multifunctional isocyanate compound, the glycidyl compound, the compound having a carboxy group and the compound having an oxazoline group illustrated above as a crosslinking agent for imparting a crosslinked structure to a cationic polymer. Among these, the multifunctional isocyanate compound is preferable due to the fact that the multifunctional isocyanate compound has high reactivity with the cationic polymer, and can easily form a crosslinked structure.

Examples of the compound having reactivity with an anionic polymer include at least one compound selected from the group consisting of the glycidyl compound and the compound having an oxazoline group. Examples of the glycidyl compound and the compound having an oxazoline group include the glycidyl compound and the compound having an oxazoline group illustrated above as a crosslinking agent for providing a cationic polymer with a crosslinked structure. Among these, the glycidyl compound is preferable due to the fact that glycidyl compound has high reactivity with the anionic polymers.

When the second adhesive layer 17 includes an acid-modified polyolefin resin, it is preferable that the reactive compound also have reactivity with an acidic group in the acid-modified polyolefin resin (in other words, forms a covalent bond with the acidic group). As a result of this, the adhesiveness to the anti-corrosion treatment layer 14 further increases. In addition, the acid-modified polyolefin resin is set to have a crosslinked structure, and the solvent resistance of the packaging material 20 further enhances.

It is preferable that the content of the reactive compound be from the same equivalents to ten times equivalents in relation to the acidic group in the acid-modified polyolefin resin. At the same equivalents or higher, the reactive compound satisfactorily reacts with the acidic group in the acid-modified polyolefin resin. On the other hand, when greater than the ten times equivalents, the crosslinking reaction with the acid-modified polyolefin resin fully reaches to saturation, and therefore, unreacted materials are present, and decrease in various kinds of performance is concerned. Therefore, bay way of example, it is preferable that the content of the reactive compound be 5 to 20 parts by mass (the ratio by solids content) per 100 parts by mass of the acid-modified polyolefin resin.

The acid-modified polyolefin resin is prepared by introducing an acidic group to a polyolefin resin. Examples of the acidic group include a carboxy group, a sulfonic acid group, and an acid anhydride group, and a maleic acid anhydride group and a (meth)acrylic acid group are particularly preferable. As the acid-modified polyolefin resin, for example, it is possible to use those analogous to that illustrated as a modified polyolefin resin (a) for use in the adhesive resin layer 15.

It is also possible to formulate a variety of additives such as a flame retardant, a slip agent, an anti-blocking agent, an antioxidant, a light stabilizer and a tackifier into the second adhesive layer 17.

In view of suppressing the decrease in laminating strength in the case of involvement of the electrolytic solution, and in view of further suppressing the decrease in insulation properties, the second adhesive layer 17 can include, for example, the acid-modified polyolefin, and at least one curing selected from the group consisting of the multifunctional isocyanate compound, the glycidyl compound, the compound having a carboxy group, the compound having an oxazoline group and a carbodiimide compound. Note that examples of the carbodiimide compound include N,N'-di-o-toluyl carbodiimide, N,N'-diphenyl carbodiimide, N,N'-di-2,6-dimethylphenyl carbodiimide, N,N'-bis(2,6-diisopropylphenyl) carbodiimide, N,N'-dioctyldecyl carbodiimide, N-triyl-N'-cyclohexyl carbodiimide, N,N'-di-2,2-di-t-butylphenyl carbodiimide, N-triyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-di-cyclohexyl carbodiimide, and N,N'-di-p-toluyl carbodiimide.

Also, as the adhesive forming the second adhesive layer 17, it is also possible to use, for example, polyurethane-based adhesive prepared by formulating a polyester polyol consisting of a hydrogenated dimeric fatty acid and a diol, and a polyisocyanate.

In view of achieving a desired adhesive strength, processability and the like, it is preferable for the thickness of the second adhesive layer 17 to be, but not limited in particular, 1 to 10 µm, and it is more preferable for the thickness of the second adhesive layer 17 to be 3 to 7 µm.

The configuration of the packaging material for a power storage device 20 except for the second adhesive layer 17 is analogous to as in the packaging material for a power storage device 10. Note that the thickness of the sealant layer 16 in the packaging material for a power storage device 20 is adjusted depending on the thickness of the second adhesive layer 17. The thickness of the sealant layer 16 in the packaging material for a power storage device 20 is not limited in particular; however, it is preferable that this thickness be, for example, in a range of 5 to 100 µm, and it is more preferable that this thickness be in a range of 10 to 80 µm. Also, the thickness of the sealant layer 16 can be 30 µm or less in view of thinning. Also, the total thickness of the sealant layer 16 and the second adhesive layer 17 (in other words, the total thickness of layers located at the inner side with respect to the metallic foil layer 13 on which the anti-corrosion treatment layer 14 is disposed) can be 35 µm or less. Even in such a thin film configuration, the packaging material for a power storage device of the present embodiment can suppress the decrease in insulation properties after degassing heat sealing.

FIG. 1 and FIG. 2 show the case where the sealant layer 16 is a single layer; however, the sealant layer 16 may be multilayered. When the sealant layer 16 is multilayered, there is no problem as long as at least one layer of a plurality of layers is a layer comprising the above-described additive compound; however, in view of further suppressing the decrease in insulation properties after degassing heat sealing, it is preferable that all of the plurality of layers be the layers comprising the above-described additive compound.

[Method for Producing Packaging Material]

Next, one example of a method for producing the packaging material 10 shown in FIG. 1 will be illustrated. Note that the method for producing the packaging material 10 is not limited to the following method.

A method for producing the packaging material 10 of the present embodiment is generally configured by comprising a step of laminating the anti-corrosion treatment layer 14 on the metallic foil layer 13, a step of bonding the substrate layer 11 and the metallic foil layer 13, a step of further laminating the adhesive resin layer 15 and the sealant layer 16 to produce a laminate, and where appropriate, a step of subjecting the obtained laminate to heat treatment.

(Step of Laminating Anti-Corrosion Treatment Layer 14 on Metallic Foil Layer 13)

The present step is a step of forming the anti-corrosion treatment layer 14 on the metallic foil layer 13. Examples of the method for this step include methods of, subjecting the metallic foil layer 13 to degreasing treatment, hydrothermal metamorphism treatment, positive electrode oxidation treatment or chemical conversion treatment, or methods of applying a coating agent having anti-corrosion performance to the metallic foil layer 13, as described above.

Also, when the anti-corrosion treatment layer 14 is multilayered, for example, it is possible to apply a coating solution (coating agent) constituting an anti-corrosion treatment layer on the side of the lower layer (on the side of the metallic foil layer 13) to the metallic foil layer 13, followed by burning to form a first layer, and subsequently, applying a coating solution (coating agent) constituting an anti-corrosion treatment layer on the side of the upper layer to the first layer, followed by burning to form a second layer.

It is possible to conduct the degreasing treatment by a spraying process or a dipping process, and it is possible to conduct the hydrothermal metamorphism treatment and the positive electrode oxidizing treatment by a dipping process, and it is possible to conduct the chemical conversion treatment, depending on the type of the chemical conversion treatment, by appropriately selecting a dipping process, a spraying process, coating process, or the like.

With regard to the coating process of the coating agent having anti-corrosion performance, it is possible to use a variety of methods such as gravure coating, reverse coating, roll coating, and bar coating.

As described above, a variety of treatment can be conducted on both faces or one face of the metallic foil; however, in the case where the treatment is conducted on one face of the metallic foil, with regard to the face to be treated, it is preferable to conduct the treatment on the side to which the adhesive resin layer 15 is to be laminated. Note that, where appropriate, it is also possible to conduct the above treatment on a surface of the substrate layer 11.

Also, it is preferable for each of the amounts of the coating agent for forming the first and second layers to be 0.005 to 0.200 $g/m^2$, and it is more preferable for each of the amounts to be 0.010 to 0.100 $g/m^2$.

Also, when dry curing is needed, depending on the drying conditions with regard to the anti-corrosion treatment layer 14 to be used, it is possible to conduct dry curing with the temperature of the base material in a range of 60 to 300° C.

(Step of Bonding Substrate Layer 11 with Metallic Foil Layer 13)

The present step is a step of bonding the metallic foil layer 13 on which the anti-corrosion treatment layer 14 is disposed, and the substrate layer 11 with the interposition of the first adhesive layer 12. With regard to the bonding method, the metallic foil layer 13 and the substrate layer 11 are bonded by means of the materials constituting the above-described first adhesive layer 12 using approaches such as dry lamination, non-solvent lamination and wet lamination. The first adhesive layer 12 is provided to be in a range of 1 to 10 g/m$^2$, more preferably in a range of 3 to 7 g/m$^2$ on the basis of the amount for dry application.

(Step of Laminating Adhesive Resin Layer 15 and Sealant Layer 16)

The present step is a step of forming the adhesive resin layer 15 and the sealant layer 16 on the anti-corrosion treatment layer 14 formed by the previous step. Examples of the method for this step include a method for subjecting the adhesive resin layer 15 to sandwich lamination together with the sealant layer 16 by use of an extrusion laminating machine. In addition, this laminating can be conducted by a tandem laminating process for extruding the adhesive resin layer 15 and the sealant layer 16, or by a coextrusion process. Also, by using the resin composition for forming the sealant layer, it is possible to form a single film of the sealant as a casted film in advance, and it is possible to laminate the single film of the sealant by a method in which this film is subjected to sandwich lamination together with an adhesive resin, or it is possible to laminate the single film of the sealant by a dry lamination process using an adhesive.

By means of the present step, a laminate in which each of the layers in order of the substrate layer 11/the first adhesive layer 12/the metallic foil layer 13/the anti-corrosion treatment layer 14/the adhesive resin layer 15/the sealant layer 16 is laminated as shown in FIG. 1 is obtained.

Note that the adhesive resin layer 15 can be obtained by directly laminating materials that have been dry-blended with an extrusion laminating machine so as to achieve the mixing composition of the materials described above, or can be obtained by laminating, with an extrusion laminating machine, granulation products that have been subjected to melt blending with a melt kneading machine such as a single-screw extruder, a twin-screw extruder, and a Brabender mixer in advance.

(Step of Heat Treatment)

The present step is a step of subjecting the laminate to heat treatment. By subjecting the laminate to heat treatment, it is possible to improve the adhesion between the metallic foil layer 13/the anti-corrosion treatment layer 14/the adhesive resin layer 15/the sealant layer 16 to impart better electrolytic solution resistance and hydrofluoric acid resistance to the laminate. With regard to the method for heat treatment, it is preferable to conduct the heat treatment at a temperature, at least higher than or equal to the melting points of the adhesive resin layer 15 and the sealant layer 16.

In this way, it is possible to produce the packaging material 10 of the present embodiment as shown in FIG. 1.

Next, one example of a method for producing the packaging material 20 shown in FIG. 2 will be illustrated. Note that a method for producing the packaging material 20 is not limited to the following method.

A method for producing the packaging material 20 of the present embodiment is generally configured by comprising a step of laminating the anti-corrosion treatment layer 14 on the metallic foil layer 13, a step of bonding the substrate layer 11 and the metallic foil layer 13, a step of further laminating the sealant layer 16 with the interposition of the second adhesive layer 17 to produce a laminate, and where appropriate, a step of subjecting the obtained laminate to aging treatment. Note that it is possible to conduct the steps up to the step of bonding the substrate layer 11 and the metallic foil layer 13, in a manner analogous to as in the method for producing the above-described packaging material 10.

(Step of Laminating Second Adhesive Layer 17 and Sealant Layer 16)

The present step is a step of bonding the sealant layer 16 to the side of the anti-corrosion treatment layer 14 of the metallic foil layer 13 with the interposition of the second adhesive layer 17. Examples of the method for this bonding include a wet process, and dry lamination.

In the case of the wet process, a solution or dispersion of the adhesive constituting the second adhesive layer 17 is coated on the anti-corrosion treatment layer 14, and the solvent is evaporated at a predetermined temperature (in a case where the adhesive includes an acid-modified polyolefin resin, at a temperature equal to or higher than the melting point of the acid-modified polyolefin resin), and drying and film forming are conducted, or where appropriate, burning treatments is conducted after drying and film forming Next, the sealant layers 16 are laminated to produce the packaging material 20. Examples of the coating method include a variety of coating methods illustrated above.

Examples of dry lamination include a method of forming a single film of the sealant as a casted film in advance by using a resin composition for forming the sealant layer, and laminating this film by a dry lamination process using an adhesive.

(Step of Aging Treatment)

The present step is a step of subjecting the laminate to aging (curing) treatment. By subjecting the laminate to aging treatment, it is possible to promote adhesion between the metallic foil layer 13/the anti-corrosion treatment layer 14/the second adhesive layer 17/the sealant layer 16. The aging treatment can be conducted in a range of room temperature to 100° C. The aging time is, for example, 1 to 10 days. Also, in order to further promote the adhesion between the second adhesive layer 17/the sealant layer 16, it is possible to conduct heat treatment at a temperature equal to or higher than the melting point of the second adhesive layer 17. Examples of the heat treatment include, but are not limited to, approaches such as heating by an oven, sandwiching by a heated roll (heat lamination), wrapping around a heated roll.

In this way, it is possible to produce the packaging material 20 of the present embodiment as shown in FIG. 2.

Although preferable embodiments of the packaging material for a power storage device of the present invention and the method for producing this packaging material have been described above in detail, the present invention is not limited to such certain embodiments, and a variety of variations and modifications can be made within the scope of the present invention defined in the claims.

The packaging material for a power storage device of the present invention can be suitably used as a packaging material for power storage devices such as lithium ion batteries and electrochemical capacitors such as electric double layer capacitors. Among these, the packaging material for a power storage device of the present invention is suitable as a packaging material for a lithium ion battery.

[Power Storage Device]

Next, a power storage device comprising the packaging material for a power storage device described above as a vessel will be illustrated. The power storage device comprises a battery element 1 comprising electrodes, an electrolytic solution, leads 2 extending from the above electrodes, and a vessel sandwiching the leads 2 and accommodating the battery element 1 and the electrolytic solution, and the above vessel is formed such that the sealant layer 16 is on the inner side with respect to the above-described packaging material 10 of the present embodiment. The above vessel can be obtained by stacking two packaging materials so that the sealant layers 16 are opposed to each other, and subjecting a marginal edge of the stacked packaging materials 10 to thermal fusion, and can also be obtained by folding back one packaging material, stacking the folded one packaging material, and in an analogous manner, subjecting a marginal edge of the packaging material 10 to thermal fusion. Also, the power storage device may comprise the packaging material 20 as a vessel. Examples of the power storage device include lithium ion batteries, and electrochemical capacitors such as electric double layer capacitors.

The leads 2 are sandwiched by the packaging material 10 forming a vessel so that the sealant layer 16 is on the inner side, and are sealed. The leads 2 may be sandwiched between the packaging materials 10 with the interposition of a tab sealant.

As the electrolytic solution, it is possible to use a known electrolytic solution depending on the type of the power storage device. In the case of a lithium ion battery for which the use of a packaging material for a power storage device of the present invention is suitable, examples of the electrolytic solution include an electrolytic solution obtained by dissolving a lithium salt as an electrolyte into an aprotic solvent having osmotic force such as propylene carbonate (PC), ethylene carbonate (EC), dimethyl carbonate (DMC), diethyl carbonate (DEC), ethyl methyl carbonate (EMC) or the like. It is possible to use one of the above solvents alone, or to use two or more thereof in combination as a mixed solvent. Also, it is possible to use an electrolyte layer consisting of a polymer gel impregnated with the above electrolytic solution. The SP value of the above-described electrolytic solution is usually 8.0 to 10.0.

[Method for Producing Power Storage Device]

Next, a method for producing a power storage device by using the above-described packaging material 10 will be illustrated. Here, note that the case of producing a secondary battery 50 by using a packaging material 30 of an embossed type will be illustrated as an example. FIG. 3 is a drawing illustrating the above packaging material 30 of the embossed type. FIGS. 4(a) to 4(d) and FIGS. 5(e) to 5(g) are perspective views illustrating steps of producing a half-side molded battery by using the packaging material 10. The secondary battery 50 may be a two-side molded battery produced by providing two packaging materials such as the packaging materials 30 of the embossed type, and bonding such packaging materials one another with adjusting the alignment. Also, the packaging material 30 of the embossed type may be formed by using the packaging material 20.

The secondary battery 50 as a half-side molded battery can be produced, for example, by the following steps S21 to S27.

(Step S21)

In step S21, a packaging material 10, a battery element 1 comprising electrodes, and leads 2 extending from the above electrodes are provided. The packaging material 10 is provided based on the above-described embodiment. The battery element 1 and the leads 2 are not limited in particular, and it is possible to use a known battery element 1 and leads 2.

(Step S22)

Figure 4A:
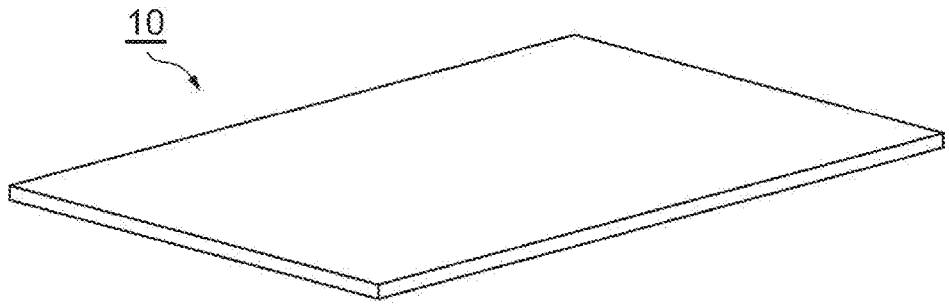
FIG. 4(a) is a perspective view in which the packaging material shown in FIG. 1 has been provided.
Figure 4B:
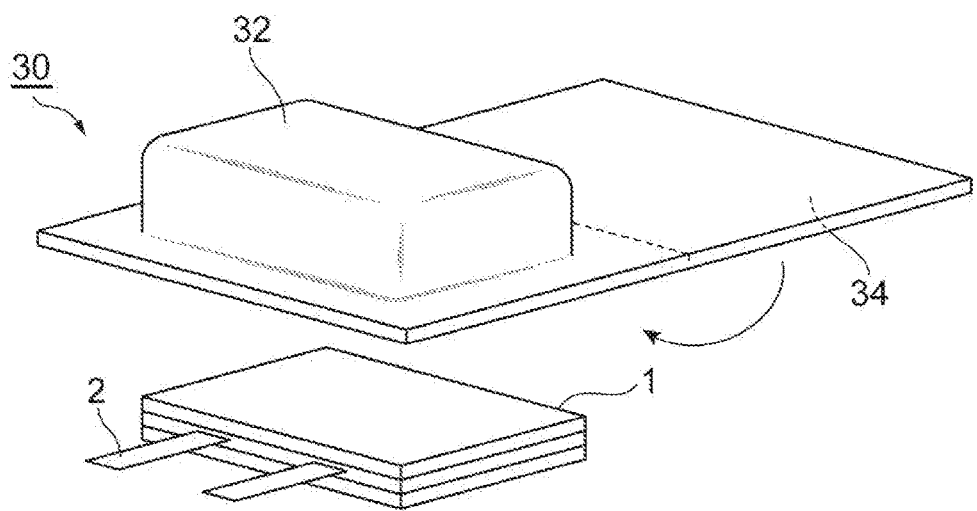
FIG. 4(b) is a perspective view in which the packaging material shown in FIG. 3(a) and a battery element have been provided.
Figure 4C:
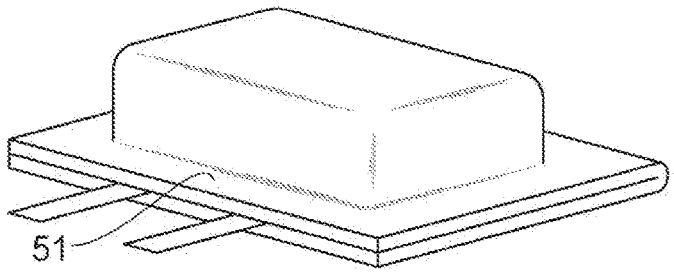
FIG. 4(c) is a perspective view illustrating a situation in which a portion of the packaging material has been folded back to melt the end of the packaging material.

In step S22, a depressed part 32 for disposing the battery element 1 on the side of the sealant layer 16 of the packaging material 10 is formed (see FIG. 4(a) and FIG. 4(b)). The planar shape of the depressed part 32 is set to be a shape coincident with the shape of the battery element 1, for example, rectangular from a plane view. The depressed part 32 is formed, for example, by pressing a pressing member having a pressure face of a rectangular shape onto a portion of the packaging material 10 in a direction of the thickness thereof. Also, a position to be pressed, in other words, a depressed part 32 is formed at a position that is located toward the side of one end of a longitudinal direction of the packaging material 10 from the center of the packaging material 10 cut into a rectangle shape. As a result of this, it is possible to form a lid (lid part 34) by folding back the other end not forming the depressed part 32 after molding.

Figure 3A:
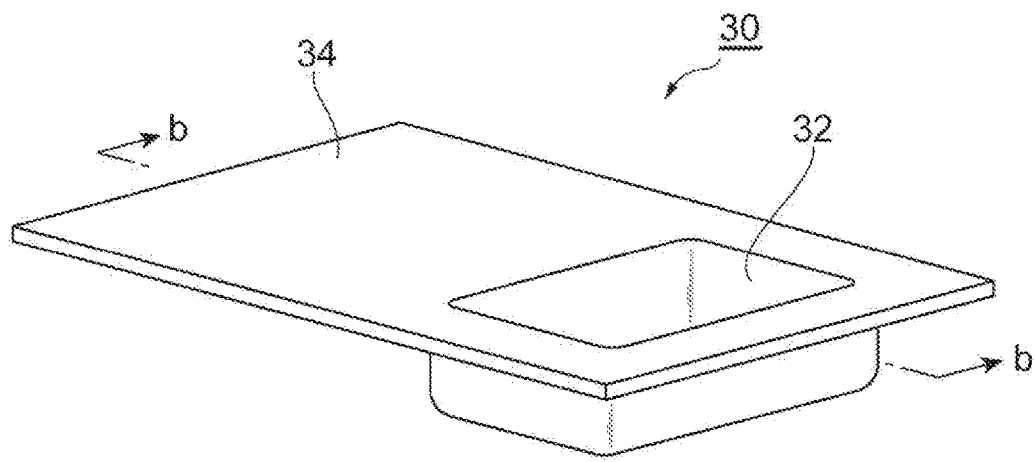
FIG. 3(a) is a perspective view illustrating a packaging material of an embossed type obtained by processing the packaging material shown in FIG. 1.
Figure 3B:
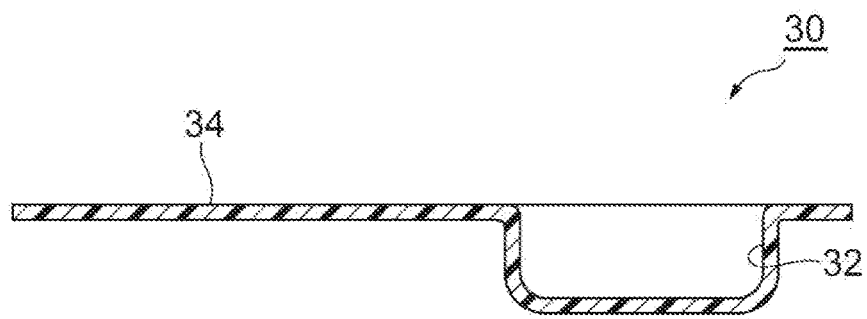
FIG. 3(b) is a vertical cross-sectional view along a line b-b shown in FIG. 3(a).

More specific examples of the method of forming the depressed part 32 include molding by using a mold (deep drawing molding). Examples of the molding method include a method of pushing a mold of a positive die together with the packaging material 10 into a mold of a negative die by using the mold of a negative die and the mold of a positive die disposed so as to have a gap that is equal to or greater than the thickness of the packaging material 10. It is possible to adjust the depth of the depressed part 32 (deep drawing degree) to a desired amount by adjusting the pushing degree of the mold of the positive die. As a result of the fact that the depressed part 32 is formed on the packaging material 10, the packaging material 30 of the embossed type is obtained. This packaging material 30 of the embossed type has a shape shown in FIG. 3, for example. Here, FIG. 3(a) is a perspective view of a packaging material 30 of an embossed type, and FIG. 3(b) is a vertical cross-sectional view along a line b-b in the packaging material 30 of the embossed type shown in FIG. 3(a).

(Step S23)

In step S23, the battery element 1 configured by a positive electrode, a separator, a negative electrode and the like is disposed in the molded area (the depressed part 32) of the packaging material 30 of the embossed type (see FIG. 4(b)). Also, the leads 2 extending from the battery element 1 and connected each to the positive electrode and the negative electrode are pulled out of the molded area (the depressed part 32). Subsequently, the packaging material 30 of the embossed type is folded back approximately at the center of the longitudinal direction, stacked so that the sealant layers 16 are at the inner side of the packaging material 30 of the embossed type, and one side 51 sandwiching the leads 2 of the packaging material 30 of the embossed type is subjected to pressurized thermal fusion (see FIG. 4(c)). The pressurized thermal fusion is controlled by three conditions of temperatures, pressures and time, and is appropriately specified. It is preferable that the temperature of the pressurized thermal fusion be at a temperature for fusing the sealant layer 16 or higher.

Note that it is preferable that the thickness of the sealant layer 16 before thermal fusion be 40 to 80% based on the thickness of the lead 2. As a result of the fact that the thickness of the sealant layer 16 is at the above lower limit value or more, the thermally fused resin tends to fully fill the end of the lead 2, and as a result of the fact that the thickness of the sealant layer 16 is at the above upper limit value or less, it is possible to moderately reduce the thickness of the end of the packaging material 10 for the secondary battery 50, and it is possible to reduce the amount of moisture entering from the end of the packaging material 10.

(Step S24)

In step S24, except for one side other than the side sandwiching the lead 2, the other sides are subjected to pressurized thermal fusion. Subsequently, the electrolytic solution is injected from the remaining one side, and the remaining one side is subjected to pressurized thermal fusion under vacuum (see FIG. 4(c)). The conditions of the pressurized thermal fusion are analogous to as in step S23.

Figure 4D:
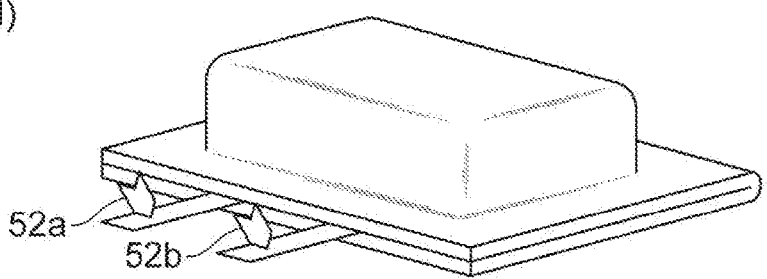
FIG. 4(d) is a perspective view illustrating a situation in which chemical conversion treatment has been conducted.

(Step S25) In step S25, in order to allow for a secondary battery to store energy, charge and discharge is performed under predetermined conditions of an electrical current value, a voltage value, an ambient temperature and the like to occur chemical change (chemical conversion) (see FIG. 4(d)). The chemical conversion is conducted by connecting electrodes 52a, 52b to two leads 2 respectively, and performing charge and discharge using an apparatus for charge and discharge. The ambient temperature is approximately at a normal temperature (25° C.) to 80° C., and the chemical conversion time is in a range of 2 to 72 hours.

(Step S26)

In step S26, one side to which the electrolytic solution has been injected is opened, and at this opened portion 53, removal of gas generated by chemical conversion and reloading of the electrolytic solution are conducted (see FIG. 5(e)). Subsequently, the opened one side is subjected to pressurized thermal fusion (degassing heat sealing) again while sandwiching the electrolytic solution between portions to be subjected to pressurized thermal fusion. As a result of this, a degassing heat-sealed portion 54 is formed (see FIG. 5(f)).

(Step S27)

In step S27, the end of the side having a marginal edge subjected to pressurized thermal fusion other than the side sandwiching the lead 2 is cut to remove the sealant layer 16 projecting out of the end. Subsequently, the portion having a marginal edge subjected to pressurized thermal fusion is folded back toward the molded area (the depressed part 32) to form a folded back portion 55, and as a result of this, a secondary battery 50 is obtained (see FIG. 5(g)).

Figure 5:
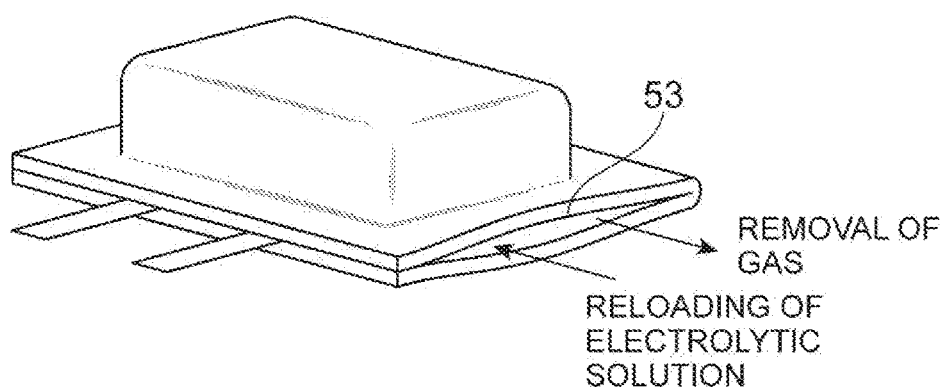
FIG. 5(e) is a perspective view illustrating a situation in which one side of the packaging material has been opened to conduct removal of a gas and reloading of the electrolytic solution.
FIG. 5(f) is a perspective view illustrating a situation in which the opened one side of the packaging material has been subjected to pressurized thermal fusion again.
FIG. 5(g) is a perspective view illustrating a situation in which both sides of the folded back portion has been folded back toward an upper direction.
Figure 5:
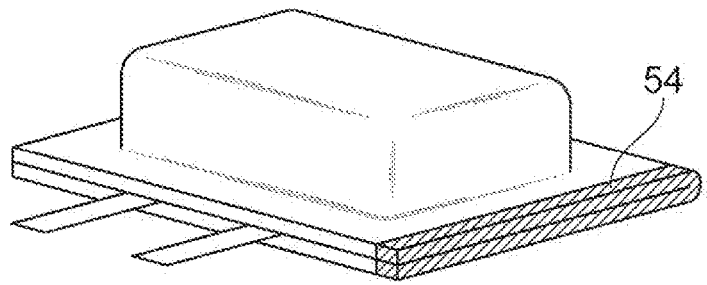
Figure 5:
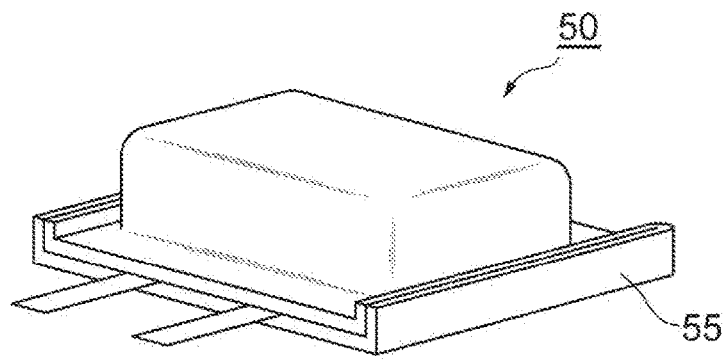
Figure 8:
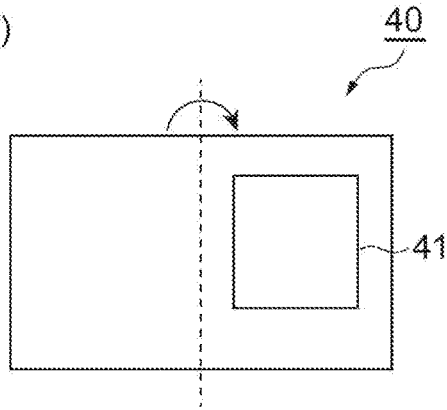
Figure 8:
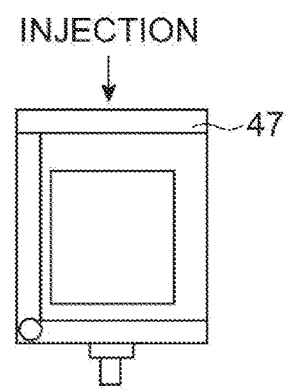
Figure 8:
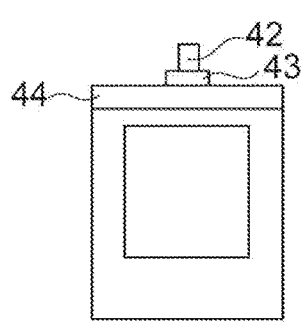
Figure 8:
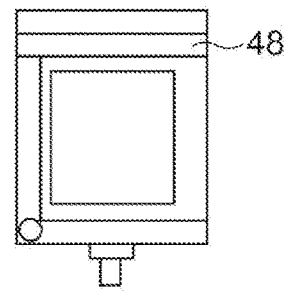
Figure 8:
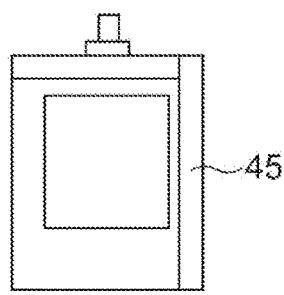
Figure 8:
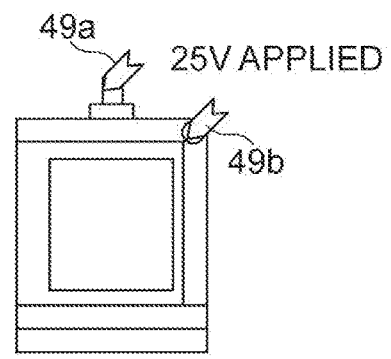
Figure 8:
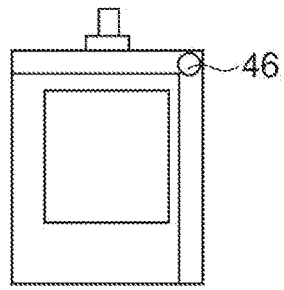

In practice, the power storage device is produced by each of steps as shown in FIG. 4 to FIG. 5. However, as described in Examples, the insulation properties of the packaging material for a power storage device after degassing heat sealing can be briefly evaluated by the method shown in FIG. 8. In this evaluation, the results reflecting the insulation properties of the actual power storage device are obtained, and therefore, by conducting this evaluation, it is possible to determine whether or not the packaging material for a power storage device is able to be applied for power storage devices. Therefore, in Examples and Comparative Examples, the evaluation by the method shown in FIG. 8 was applied as a simple and alternative evaluation method for determining whether or not the produced packaging material for a power storage device is able to be applied for power storage devices.

Although preferable embodiments of the packaging material for a power storage device, and the method for producing the power storage device according to the present invention have been described above in detail, the present invention is not limited to such certain embodiments, and a variety of variations and modifications can be made within the scope of the present invention defined in the claims.

EXAMPLES

The present invention will be specifically illustrated below with reference to Examples; however, the present invention is not limited to the following Examples.

[Materials Used]

The material used in Examples and Comparative Examples are shown as follows.

<Substrate Layer (Thickness of 15 μm)>

A nylon (Ny) film (manufactured by Toyobo Co., Ltd.) was used.

<First Adhesive Layer (Thickness of 4 μm)>

A polyurethane-based adhesive (manufactured by TOYO INK Co., Ltd.) in which a curing agent based on an adduct of tolylenediisocyanate is mixed into a polyester polyol-based base material was used.

<First Anti-Corrosion Treatment Layer (on the Side of Substrate Layer) and Second Anti-Corrosion Treatment Layer (on the Side of Sealant Layer)>

(CL-1): a "sol of sodium polyphosphate stabilized cerium oxide" in which the concentration of solids has been adjusted to 10% by mass using distilled water as a solvent was used. Note that the sol of sodium polyphosphate stabilized cerium oxide was obtained by the incorporation of 10 parts by mass of Na salt of phosphoric acid per 100 parts by mass of cerium oxide.

(CL-2): a composition consisting of 90% by mass of "polyallylamine (manufactured by Nitto Boseki Co., Ltd.)" in which the concentration of solids has been adjusted to 5% by mass using distilled water as a solvent, and 10% by mass of "polyglycerol polyglycidyl ether (manufactured by Nagase ChemteX Corporation)" was used.

(CL-3): On the basis of a water soluble phenol resin (manufactured by Sumitomo Bakelite Co., Ltd.) in which the concentration of solids has been adjusted to 1% by mass using an aqueous solution of phosphoric acid at the concentration of 1% by mass as a solvent, a chemical conversion treating agent in which the concentration of chromium fluoride ($CrF_3$) has been adjusted to be 10 mg/m$^2$ in terms of the amount of Cr present in the final dried coat was used.

<Metallic Foil Layer (Thickness of 35 μm)>

A soft aluminum foil (manufactured by Toyo Aluminum K.K., "8079 material") subjected to annealing degreasing treatment was used.

<Second Adhesive Layer (Thickness of 3 μm)>

The following adhesives a and b were provided as adhesives for forming a second adhesive layer.

Adhesive a: an adhesive in which 10 parts by mass (the ratio by solids) of a polyisocyanate compound with an isocyanurate structure was mixed per 100 parts by mass of an acid-modified polyolefin resin dissolved in toluene.

Adhesive b: an polyurethane-based adhesive prepared by formulating a polyester polyol consisting of a hydrogenated dimeric fatty acid and a diol, and a polyisocyanate in a molar ratio (NCO/OH) of 2.

<Adhesive Resin Layer>

Resin compositions in which, to the following resin A or resin B, the additive compounds shown in Table 2 were optionally added to achieve the contents shown in Table 2 (the contents based on a total amount of the adhesive resin layer of 100% by mass) were used.

(Resin A): a mixture in which the following materials were mixed in a mass ratio of (AR-1):(AR-2)=3:1 (mass ratio).

(Resin B): a resin composition of (AR-1).

(AR-1): an acid-modified polypropylene resin composition ("ADMER" manufactured by Mitsui Chemicals Inc.) based on a random polypropylene (PP) and in which ethylene-propylene rubber was formulated as incompatible rubber.

(AR-2): a propylene-α-olefin copolymer with an atactic structure ("Tafthren H" manufactured by Sumitomo Chemical Company, Limited).

<Sealant Layer>

Resin compositions in which, to the following resins C to F, the additive compounds shown in Table 2 were optionally added to achieve the contents shown in Table 2 (the contents based on a total amount of the sealant layer of 100% by mass) were used.

(Resin C): a composition in which, to 70 parts by mass of a propylene-ethylene random copolymer ("Prime Polypro" manufactured by Prime Polymer Co., Ltd.) with a melting point of 140° C., 30 parts by mass of a mixture prepared by mixing propylene-1-butene random copolymer elastomer ("TAFMER XM" manufactured by Mitsui Chemicals Inc.) with a melting point of 85° C. and having compatibility with the above propylene-ethylene random copolymer, and an ethylene-1-butene random copolymer elastomer ("EXCELLEN" manufactured by Sumitomo Chemical Company, Limited) with a melting point of 75° C. and not having compatibility with the above propylene-ethylene random copolymer in a mass ratio of 2:1 were added as an impact resistance modifier.

(Resin D): a composition in which, to 70 parts by mass of a propylene-ethylene random copolymer ("Prime Polypro" manufactured by Prime Polymer Co., Ltd.) with a melting point of 140° C., 30 parts by mass of propylene-1-butene random copolymer elastomer ("TAFMER XM" manufactured by Mitsui Chemicals Inc.) with a melting point of 85° C. and having compatibility with the above propylene-ethylene random copolymer was added as an impact resistance modifier.

(Resin E): a composition in which, to 70 parts by mass of a propylene-ethylene random copolymer ("Prime Polypro" manufactured by Prime Polymer Co., Ltd.) having a melting point of 140° C., 30 parts by mass of ethylene-1-butene random copolymer elastomer ("EXCELLEN" manufactured by Sumitomo Chemical Company Limited) with a melting point of 75° C. and not having compatibility with the above propylene-ethylene random copolymer was added as an impact resistance modifier.

(Resin F): a composition in which, to 95 parts by mass of a propylene-ethylene random copolymer ("Prime Polypro" manufactured by Prime Polymer Co., Ltd.) with a melting point of 140° C., 5 parts by mass of a mixture prepared by mixing propylene-1-butene random copolymer elastomer ("TAFMER XM" manufactured by Mitsui Chemicals Inc.) with a melting point of 85° C. and having compatibility with the above propylene-ethylene random copolymer, and ethylene-1-butene random copolymer elastomer ("EXCELLEN" manufactured by Sumitomo Chemical Company Limited) with a melting point of 75° C. and not having compatibility with the above propylene-ethylene random copolymer in a mass ratio of 2:1 was added as an impact resistance modifier.

<Additive Compound>

The structural formulae, SP values (unit: $(cal/cm^3)^{1/2}$) and molecular weights of the additive compounds used in the adhesive resin layer and/or the sealant layer are shown in the following Table 1.

TABLE 1

| Name | Structural formula | SP value | Molecular weight |
|---|---|---|---|
| Nonitol derivative | [structure with $R^1$, $R^2$ = —H, —CH$_3$, —CH$_2$—CH$_3$ or —CH$_2$CH$_2$CH$_3$] | 11.9~13.0 | 400.4~484.6 |
| Amide-based compound | [structure] | 13.1 | 468.5 |
| Copolymer of terpenoids and phenols | [structure] | 12.3 | 200~2000 |

TABLE 1-continued

| Name | Structural formula | SP value | Molecular weight |
|---|---|---|---|
| Sorbitol derivative | (structure shown) $R^2$ = —H, —CH$_3$, —CH$_2$—CH$_3$ or —CH$_2$CH$_2$CH$_3$ | 12.4~14.0 | 358.3~442.5 |
| Polyolefin with both the end groups modified with hydroxy groups (a) | HO—(CH$_2$CH$_2$CH$_2$CH$_2$)$_x$—(CH$_2$CH)$_y$—OH with side chain CH$_2$CH$_3$ | 12.5 | 1000~5000 |
| Polyolefin with both the end groups modified with hydroxy groups (b) | | 12.5 | 6500 |
| Polymer of terpenoids | (structure shown) | 9.0 | 200~2000 |
| Phenol derivative | (di-tert-butyl phenol structure) | 10.2 | 220.3 |
| Acid amide | (oleamide structure) | 9.5 | 337.6 |
| Alcohol derivative (1,2-butanediol) | (structure shown) | 14.8 | 90.1 |

Example 1

First of all, the first and second anti-corrosion treatment layers were disposed on the metallic foil layer by the following procedure. In other words, (CL-1) was applied onto both faces of the metallic foil layer so as to achieve a dry amount to be applied of 70 mg/m$^2$ by microgravure coating, and was subjected to burning treatment at 200° C. in a drying unit. Then, (CL-2) was applied onto the obtained layer so as to achieve a dry amount to be applied of 20 mg/m$^2$ by microgravure coating to form a composite layer consisting of (CL-1) and (CL-2) as the first and second anti-corrosion treatment layers. This composite layer undergoes the expression of anti-corrosion performance by combination of two materials of (CL-1) and (CL-2).

Next, the side of the first anti-corrosion treatment layer of the metallic foil layer on which the first and second anti-corrosion treatment layers were disposed was bonded onto the substrate layer by a dry laminating approach using a polyurethane-based adhesive (first adhesive layer). This was placed at an unwinding unit of the extrusion laminating machine, and was coextruded on the second anti-corrosion treatment layer under processing conditions of 270° C. and 100 m/min to laminate an adhesive resin layer (thickness of 10 µm) and a sealant layer (thickness of 20 µm) in this order. Note that, with regard to the adhesive resin layer and the sealant layer, a variety of compounds of their materials have been produced by a twin-screw extruder in advance, and after steps of water cooling and pelletization, were used in the above extrusion laminating. For the formation of the adhesive resin layer, a resin composition in which the additive compound was added to the resin A was used. For the formation of the sealant layer, a resin composition in which the additive compound was added to the resin C was used. As the additive compounds, the nonitol derivative shown in Table 1 was used. Note that, in the nonitol derivative shown in Table 1, $R^1$ represents a hydrogen atom or an alkyl group having 1 to 3 carbon atoms, and even in either case where $R^1$ is a hydrogen atom or where $R^1$ is an alkyl group having 1 to 3 carbon atoms, the SP value is in a range of 11.9 to 13.0 $(cal/cm^3)^{1/2}$, and it is possible to achieve almost equivalent effects. Here, when $R^1$ is a hydrogen atom, the SP value of the nonitol derivative is 13.0 $(cal/cm^3)^{1/2}$ and the molecular weight is 400.4, and when $R^1$ is a methyl group, the SP value of the nonitol derivative is 12.6 $(cal/cm^3)^{1/2}$ and the molecular weight is 428.5, and when $R^1$ is an ethyl group, the SP value of the nonitol derivative is 12.2 $(cal/cm^3)^{1/2}$ and the molecular weight is 456.5, and when $R^1$ is a propyl group, the SP value of the nonitol derivative is 11.9 $(cal/cm^3)^{1/2}$, and the molecular weight is 484.6.

The laminate obtained in this way was subjected to heat treatment so as to set the highest reached temperature at which the laminate reached to be 190° C., and as a result of this, the packaging material of Example 1 (a laminate of the substrate layer/the first adhesive layer/the first anti-corrosion treatment layer/the metallic foil layer/the second anti-corrosion treatment layer/the adhesive resin layer/the sealant layer) was produced.

Examples 2 to 4

For the formation of the sealant layer, the packaging materials of Examples 2 to 4 were produced in a manner analogous to as in Example 1, except for the fact that the resin composition in which the additive compound was added to the resin D, the resin E or resin F.

Example 5

For the formation of the adhesive resin layer, the packaging material of Example 5 was produced in a manner analogous to as in Example 1, except for the fact that the resin composition in which the additive compound was added to the resin B was used.

Example 6

First of all, the first and second anti-corrosion treatment layers were disposed on the metallic foil layer by the following procedure. In other words, (CL-3) was applied onto both faces of the metallic foil layer so as to achieve a dry amount to be applied of 30 mg/m² by microgravure coating, and was subjected to burning treatment at 200° C. in a drying unit. Then, (CL-2) was applied onto the obtained layer so as to achieve a dry amount to be applied of 20 mg/m² by microgravure coating to form a composite layer consisting of (CL-3) and (CL-2) as the first and second anti-corrosion treatment layer. This composite layer undergoes the expression of anti-corrosion performance by combination of two materials of (CL-3) and (CL-2). In this way, a packaging material of Example 6 was produced in a manner analogous to as in Example 1, except for the fact that the metallic foil layer on which the first and second anti-corrosion treatment layers were disposed was used.

Example 7

The first and second anti-corrosion treatment layers were disposed on the metallic foil layer in a manner analogous to as in Example 1. The side of the first anti-corrosion treatment layer of the metallic foil layer on which the first and second anti-corrosion treatment layers were disposed was bonded onto the substrate layer by a dry laminating approach using a polyurethane-based adhesive (the first adhesive layer). Then, the side of the second anti-corrosion treatment layer of the metallic foil layer on which the first and second anti-corrosion treatment layer were disposed was bonded to the sealant layer (thickness of 30 µm) that has been film-formed as a casted film in advance by a dry laminating approach using the adhesive a (the second adhesive layer). For the film-formation of the sealant layer, the resin composition in which the nonitol derivative as an additive compound was added to the resin C was used.

In this way, the obtained laminate was subjected to aging treatment at 40° C. for 4 days to produce a packaging material of Example 7 (a laminate of the substrate layer/the first adhesive layer/the first anti-corrosion treatment layer/the metallic foil layer/the second anti-corrosion treatment layer/the second adhesive layer/the sealant layer).

Example 8

A packaging material of Example 8 was produced in a manner analogous to as in Example 7, except for the fact that the adhesive used in the formation of the second adhesive layer was replaced with the adhesive b.

Example 9

A packaging material of Example 9 was produced in a manner analogous to as in Example 1, except for the fact that the resin composition without the addition of the additive compound was used for the formation of the adhesive resin layer.

Example 10

A packaging material of Example 10 was produced in a manner analogous to as in Example 1, except for the fact that the resin composition without the addition of the additive compound was used for the formation of the sealant layer.

Examples 11 to 12

Packaging materials of Examples 11 to 12 were produced in a manner analogous to as in Example 1, except for the fact that the content of the additive compound in the adhesive resin layer and the sealant layer was changed as shown in Table 2.

Example 13 to 17

Packaging materials of Examples 13 to 17 were produced in a manner analogous to as in Example 1. In the evaluation test described below, these packaging materials are for the evaluation using the electrolytic solution different than that in Example 1.

Examples 18 to 26

Packaging materials of Examples 18 to 26 were produced in a manner analogous to as in Example 1, except for the fact that the type and the content of the additive compounds used in the adhesive resin layer and sealant layer were changed as shown in Table 2. Note that, in the sorbitol derivative shown in Table 1, $R^2$ represents a hydrogen atom or an alkyl group having 1 to 3 carbon atoms, and even in either case where $R^2$ is a hydrogen atom or where $R^2$ is an alkyl group having 1 to 3 carbon atoms, the SP value is in a range of 12.4 to 14.0 $(cal/cm^3)^{1/2}$, and it is possible to achieve almost equivalent effects. Here, when $R^2$ is a hydrogen atom, the SP value of the sorbitol derivative is 14.0 $(cal/cm^3)^{1/2}$ and the molecular weight is 358.3, and when $R^2$ is a methyl group, the SP value of the sorbitol derivative is 13.4 $(cal/cm^3)^{1/2}$ and the molecular weight is 386.4, and when $R^2$ is an ethyl group, the SP value of the sorbitol derivative is 12.9 $(cal/cm^3)^{1/2}$ and the molecular weight is 414.5, and when $R^2$ is a propyl group, the SP value of the sorbitol derivative is 12.4 $(cal/cm^3)^{1/2}$ and the molecular weight is 442.5.

Comparative Examples 1 to 5

Packaging materials of Comparative Examples 1 to 5 were produced in a manner analogous to as in Example 1, except for the fact that the type and the content of the additive compounds used in the adhesive resin layer and the sealant layer were changed as shown in Table 2.

Comparative Example 6

A packaging material of Comparative Example 6 was produced in a manner analogous to as in Example 1, except for the fact that the resin composition without the addition of the additive compound was used for the formation of the adhesive resin layer and the sealant layer.

Principal conditions with regard to each of the Examples and Comparative Examples are shown in Table 2.

TABLE 2

| | | | Adhesive resin layer | | | Sealant layer | | |
| | | | Composition | Additive compound | | Composition | Additive compound | |
| | Anti-corrosion treatment layer | Adhesive | of resin and film thickness | Type | Content (% by mass) | of resin and film thickness | Type | Content (% by mass) |
|---|---|---|---|---|---|---|---|---|
| Example 1 | (CL-1) + (CL-2) | — | Resin A (10 μm) | Nonitol derivative | 0.25 | Resin C (20 μm) | Nonitol derivative | 0.25 |
| Example 2 | (CL-1) + (CL-2) | — | Resin A (10 μm) | Nonitol derivative | 0.25 | Resin D (20 μm) | Nonitol derivative | 0.25 |
| Example 3 | (CL-1) + (CL-2) | — | Resin A (10 μm) | Nonitol derivative | 0.25 | Resin E (20 μm) | Nonitol derivative | 0.25 |
| Example 4 | (CL-1) + (CL-2) | — | Resin A (10 μm) | Nonitol derivative | 0.25 | Resin F (20 μm) | Nonitol derivative | 0.25 |
| Example 5 | (CL-1) + (CL-2) | — | Resin B (10 μm) | Nonitol derivative | 0.25 | Resin C (20 μm) | Nonitol derivative | 0.25 |
| Example 6 | (CL-3) + (CL-2) | — | Resin A (10 μm) | Nonitol derivative | 0.25 | Resin C (20 μm) | Nonitol derivative | 0.25 |
| Example 7 | (CL-1) + (CL-2) | Adhesive a | — | — | — | Resin C (30 μm) | Nonitol derivative | 0.25 |
| Example 8 | (CL-1) + (CL-2) | Adhesive b | — | — | — | Resin C (30 μm) | Nonitol derivative | 0.25 |
| Example 9 | (CL-1) + (CL-2) | — | Resin A (10 μm) | — | — | Resin C (20 μm) | Nonitol derivative | 0.25 |
| Example 10 | (CL1) + (CL-2) | — | Resin A (10 μm) | Nonitol derivative | 0.25 | Resin C (20 μm) | — | — |
| Example 11 | (CL-1) + (CL-2) | — | Resin A (10 μm) | Nonitol derivative | 0.05 | Resin C (20 μm) | Nonitol derivative | 0.05 |
| Example 12 | (CL-1) + (CL-2) | — | Resin A (10 μm) | Nonitol derivative | 2.00 | Resin C (20 μm) | Nonitol derivative | 2.00 |
| Example 13 | (CL-1) + (CL-2) | — | Resin A (10 μm) | Nonitol derivative | 0.25 | Resin C (20 μm) | Nonitol derivative | 0.25 |
| Example 14 | (CL-1) + (CL-2) | — | Resin A (10 μm) | Nonitol derivative | 0.25 | Resin C (20 μm) | Nonitol derivative | 0.25 |
| Example 15 | (CL-1) + (CL-2) | — | Resin A (10 μm) | Nonitol derivative | 0.25 | Resin C (20 μm) | Nonitol derivative | 0.25 |
| Example 16 | (CL-1) + (CL-2) | — | Resin A (10 μm) | Nonitol derivative | 0.25 | Resin C (20 μm) | Nonitol derivative | 0.25 |
| Example 17 | (CL-1) + (CL-2) | — | Resin A (10 μm) | Nonitol derivative | 0.25 | Resin C (20 μm) | Nonitol derivative | 0.25 |
| Example 18 | (CL-1) + (CL-2) | — | Resin A (10 μm) | Amide-based compound | 0.25 | Resin C (20 μm) | Amide-based compound | 0.25 |
| Example 19 | (CL-1) + (CL-2) | — | Resin A (10 μm) | Copolymer of terpenoids and phenols | 5.00 | Resin C (20 μm) | Copolymer of terpenoids and phenols | 5.00 |
| Example 20 | (CL-1) + (CL-2) | — | Resin A (10 μm) | Copolymer of terpenoids and phenols | 10.00 | Resin C (20 μm) | Copolymer of terpenoids and phenols | 10.00 |
| Example 21 | (CL-1) + (CL-2) | — | Resin A (10 μm) | Copolymer of terpenoids and phenols | 20.00 | Resin C (20 μm) | Copolymer of terpenoids and phenols | 20.00 |
| Example 22 | (CL-1) + (CL-2) | — | Resin A (10 μm) | Copolymer of terpenoids and phenols | 40.00 | Resin C (20 μm) | Copolymer of terpenoids and phenols | 40.00 |

TABLE 2-continued

|  | Anti-corrosion treatment layer | Adhesive | Adhesive resin layer | | | Sealant layer | | |
|---|---|---|---|---|---|---|---|---|
|  |  |  | Composition of resin and film thickness | Additive compound Type | Content (% by mass) | Composition of resin and film thickness | Additive compound Type | Content (% by mass) |
| Example 23 | (CL-1) + (CL-2) | — | Resin A (10 μm) | Sorbitol derivative | 0.25 | Resin C (20 μm) | Sorbitol derivative | 0.25 |
| Example 24 | (CL-1) + (CL-2) | — | Resin A (10 μm) | Polyolefin with both the end groups modified with hydroxy groups (a) | 0.25 | Resin C (20 μm) | Polyolefin with both the end groups modified with hydroxy groups (a) | 0.25 |
| Example 25 | (CL-1) + (CL-2) | — | Resin A (10 μm) | Alcohol derivative | 0.25 | Resin C (20 μm) | Alcohol derivative | 0.25 |
| Example 26 | (CL-1) + (CL-2) | — | Resin A (10 μm) | Polyolefin with both the end groups modified with hydroxy groups (b) | 0.25 | Resin C (20 μm) | Polyolefin with both the end groups modified with hydroxy groups (b) | 0.25 |
| Comparative Example 1 | (CL-1) + (CL-2) | — | Resin A (10 μm) | Polymer of terpenoids | 5.00 | Resin C (20 μm) | Polymer of terpenoids | 5.00 |
| Comparative Example 2 | (CL-1) + (CL-2) | — | Resin A (10 μm) | Phenol derivative | 0.25 | Resin C (20 μm) | Phenol derivative | 0.25 |
| Comparative Example 3 | (CL-1) + (CL-2) | — | Resin A (10 μm) | Phenol derivative | 10.00 | Resin C (20 μm) | Phenol derivative | 10.00 |
| Comparative Example 4 | (CL-1) + (CL-2) | — | Resin A (10 μm) | Acid amide | 0.25 | Resin C (20 μm) | Acid amide | 0.25 |
| Comparative Example 5 | (CL-1) + (CL-2) | — | Resin A (10 μm) | Acid amide | 10.00 | Resin C (20 μm) | Acid amide | 10.00 |
| Comparative Example 6 | (CL-1) + (CL-2) | — | Resin A (10 μm) | — | — | Resin C (20 μm) | — | — |

<Evaluation>

The following evaluation tests were conducted on the packaging materials obtained in Examples and Comparative Examples.

(Electrolytic Solution Laminating Strength)

An electrolytic solution in which $LiPF_6$ was added to a mixed solvent of the composition and the proportion (mass ratio) shown in Table 3 to achieve an amount of 1 M was loaded in a Teflon® vessel, and a sample obtained by cutting the packaging material into 15 mm×100 mm was placed in this vessel, and after well-stoppered, this vessel was stored at 85° C. for 24 hours. Next, washing together was conducted, and laminating strength (T-peel strength) between the metallic foil layer/the adhesive resin or between the metallic foil layer/the second adhesive layer was measured by a testing machine (manufactured by INSTRON). The test was conducted according to JIS K6854 at 23° C. under an atmosphere of 50% RH with a peeling rate of 50 mm/min. On the basis of the results, evaluation was conducted according to the following criteria.
A: Laminating strength is greater than 7 N/15 mm
B: Laminating strength is 6 N/15 mm or more, and 7 N/15 mm or less
C: Laminating strength is 5 N/15 mm or more and less than 6 N/15 mm
D: Laminating strength is less than 5 N/15 mm (Electrolytic Solution Heat Sealing Strength)

Figure 6:
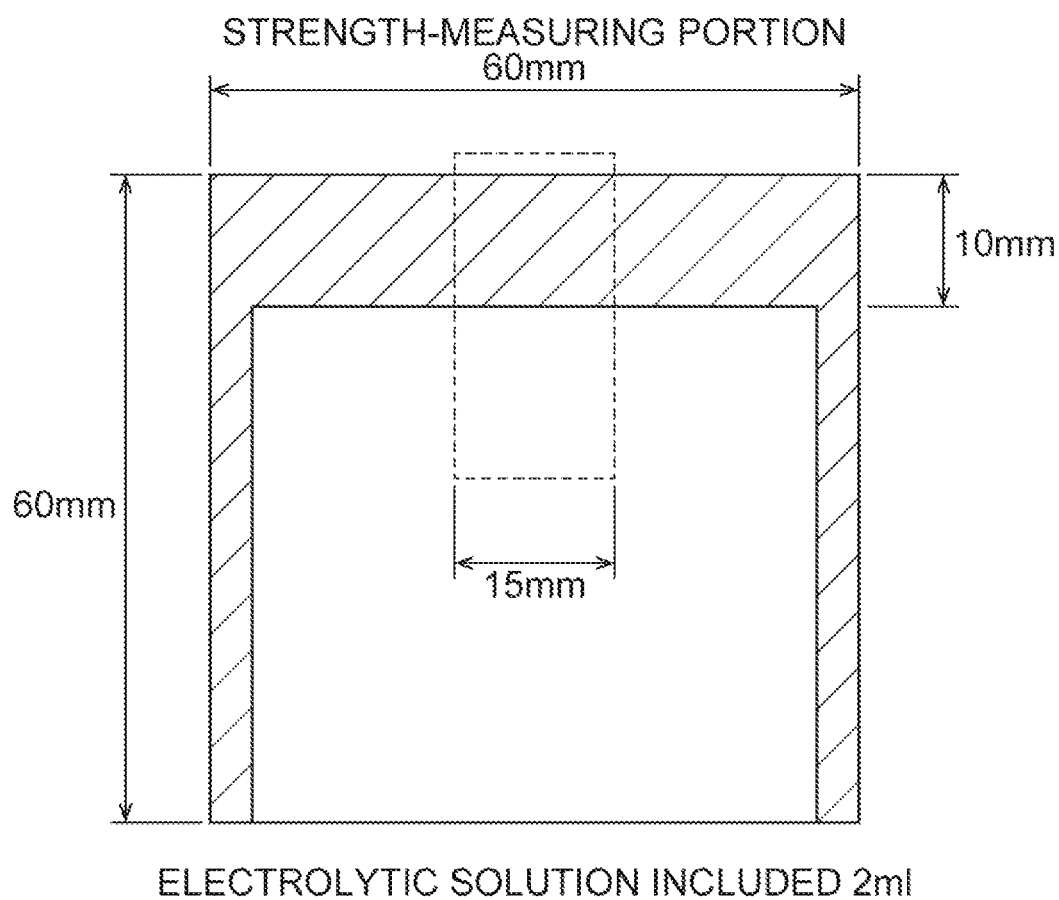
FIG. 6 is a schematic view illustrating a method for producing a sample to be evaluated in Examples.

A sample obtained by cutting the packaging material into 60 mm×120 mm was folded into two, and one side of the folded sample was heat-sealed with a sealing bar with a width of 10 mm at 190° C. and 0.5 MPa for 3 seconds. Next, the remaining two sides of the folded sample were also heat-sealed to achieve a bag-shaped packaging material, and within this bag-shaped packaging material, the pouch in which 2 ml of electrolytic solution in which $LiPF_6$ was added to a mixed solvent of the composition and the proportion (mass ratio) shown in Table 3 to achieve an amount of 1 M has been injected was stored at 60° C. for 24 hours, and subsequently, the firstly heat-sealed one side was cut to have a width of 15 mm (see FIG. 6), and sealing strength (T-peel strength) was measured by a testing machine (manufactured by INSTRON). The test was conducted according to JIS K6854 at 23° C. under an atmosphere of 50% RH with a peeling rate of 50 mm/min. On the basis of the results, the evaluation was conducted according to the following criteria.
A: Sealing strength is 50 N/15 mm or more, and burst width is greater than 5 mm
B: Sealing strength is 50 N/15 mm or more, and burst width is 3 to 5 mm
C: Sealing strength is 40 N/15 mm or more and less than 50 N/15 mm
D: Sealing strength is less than 40 N/15 mm (Degassing Heat Seal Strength (Degas Heat Seal Strength))

Figure 7:
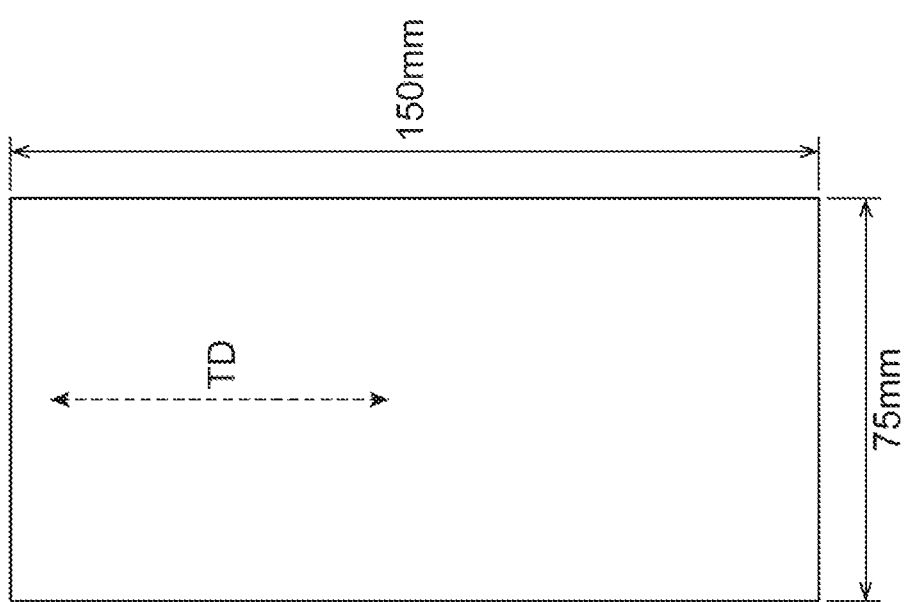

A sample obtained by cutting the packaging material into 75 mm×150 mm was folded into two to be 37.5 mm×150 mm (see FIG. 7(a)), and subsequently, the side of 150 mm length and one of the sides of 37.5 mm length were heat-sealed to produce a pouch. Next, into this pouch, 5 ml of electrolytic solution in which $LiPF_6$ was added into a mixed solvent of the composition and the proportion (mass ratio) shown in Table 3 to achieve an amount of 1 M was injected, and the other side of 37.5 mm length was heat-sealed to obtain a pouch sealed by a sealed portion S1. Then, after storing this pouch at 60° C. for 24 hours, the central portion of the pouch including the electrolytic solution was heat-sealed at 190° C. and 0.3 MPa for 2 seconds (degassing heat sealed portion S2, see FIG. 7(b)). In order to stabilize the sealed portion, after stored at normal temperatures for 24 hours, the region including the degassing heat sealed portion S2 was cut to a width of 15 mm (see FIG. 7(c)), heat seal strength (T-peel strength) was measured by a testing machine (manufactured by INSTRON). The test was conducted according to JIS K6854 at 23° C. under an atmosphere of 50% RH with a peeling rate of 50 mm/min. On the basis of the results, the evaluation was conducted according to the following criteria.

A: Sealing strength is 50 N/15 mm or more
B: Sealing strength is 35 N/15 mm or more and less than 50 N/15 mm
C: Sealing strength is 25 N/15 mm or more and less than 35 N/15 mm
D: Sealing strength is less than 25 N/15 mm (Whitening after Molding (Molding Whitening))

The sample of the packaging material in a normal state, and the sample stored at 60° C. for one week were cut into 120 mm×200 mm, and were placed into a mold for cold molding so that the sealant layer comes into contact with a projected part of the molding machine, and deep drawing of 2.0 mm was conducted with a molding rate of 5 mm/sec. Next, whitening with regard to a side located at the film holding portion having the largest degree of stretching was observed. As the mold, a mold having molding area of 80 mm×70 mm (rectangular cylindrical shape) and punching corner radius (RCP) of 1.0 mm was used. On the basis of the results, evaluation was conducted according to the following criteria. Note that, when the evaluation is C or higher, it can be said that there is no problem in practice.

A: No whitening with regard to the sample in a normal state, and the sample stored at 60° C. for one week
B: No whitening with regard to the sample in a normal state, and slight whitening with regard to the sample stored at 60° C. for one week
C: Slight whitening with regard to the sample in a normal state, and whitening with regard to the sample stored at 60° C. for one week
D: Whitening with regard to the sample in a normal state (Insulation Properties after Degassing Heat Sealing (Degassing Insulation))

A sample 40 obtained by cutting the packaging material into 120 mm×200 mm was placed into a mold for cold molding so that the sealant layer comes into contact with a projected part of the molding machine, and deep drawing of 2.0 mm was conducted with a molding rate of 15 mm/sec to form a deep drawing portion 41, and subsequently, the sample 40 was folded into two to be 120 mm×100 mm (see FIG. 8(a)). Then, an upper side portion 44 of 100 mm was heat-sealed with interposing a tab 42 and a tab sealant 43 (see FIG. 8(b)), and subsequently, a lateral side portion 45 of 120 mm was heat-sealed to produce a pouch (see FIG. 8(c)). Next, in order to enable contact with the electrode, a portion of the outer layer of the sample 40 was cut away to form an exposed portion 46 of the metallic foil layer (see FIG. 8(d)). Then, 5 ml of electrolytic solution in which $LiPF_6$ was added to a mixed solvent of the composition and the proportion (mass ratio) shown in Table 3 to achieve an amount of 1 M was injected in the pouch, and a lower side portion 47 of 100 mm was sealed by heat seal (see FIG. 8(e)). Next, this pouch was allowed to stand at 60° C. for 24 hours in a flatly placed state, and a portion 48 located at the inner side with respect to the heat-sealed lower side portion 47 was subjected to degassing heat seal while sandwiching the electrolytic solution between portions to be heat-sealed at 190° C. and 0.3 MPa (surface pressure) for 2 seconds (see FIG. 8(f)). Then, the tab 42 and the exposed portion 46 of the metallic foil layer were respectively connected with electrodes 49a, 49b, and by applying 25 V using a withstanding voltage/insulation resistance tester (manufactured by KIKUSUI ELECTRONICS CORPORATION, "TOS9201"), the resistance value at the moment was measured (see FIG. 8(g)). As the mold, a mold with a molding area of 80 mm×70 mm (rectangular cylindrical shape) and punching corner radius (RCP) of 1.0 mm was used. On the basis of the results, the evaluation was conducted according to the following criteria.

A: Resistance value is greater than 200 MΩ
B: Resistance value is 100 MΩ or more, and 200 MΩ or less
C: Resistance value is 30 MΩ or more and less than 100 MΩ
D: Resistance value is less than 30 MΩ

Also, with regard to the sample of which the resistance value was less than 30 MΩ (D evaluation) in the results of the above evaluation, 25 V was further applied across the electrodes 49a, 49b for 2 hours by using a withstanding voltage/insulation resistance tester (manufactured by KIKUSUI ELECTRONICS CORPORATION, "TOS9201") to identify the insulation diminished site. By applying voltage for a prolonged time, a reaction product of the metallic foil layer (aluminum foil) and the electrolytic solution precipitates from the insulation diminished site, and as a result of this, it is possible to identify the insulation diminished site. Note that, in the above evaluation method, the insulation properties of the sample subjected to all of typical heat seal for the lateral side portion, top seal for heat-sealing while sandwiching the tab sealant and the tab at a time, deep drawing molding, and degassing heat seal were evaluated, and therefore, when the evaluation results are good, the decrease in insulation properties was able to be suppressed with regard to all of the treatment described above.

(Overall Quality)

The results of each of the above evaluations are shown in Table 3. In the following Table 3, the items having no evaluation of D with regard to the results of each evaluation are considered to have good overall quality.

TABLE 3

| | | Electrolytic solution | | Evaluation results | | | | | |
| | | Composition | | | | | | Degassing insulation | |
| | SP value of additive compound | and proportion (mass ratio) of solvent | SP value | Electrolytic solution laminating strength | Electrolytic solution heat sealing strength | Degas heat seal strength | Molding whitening | Insulation properties | Insulation diminished site |
|---|---|---|---|---|---|---|---|---|---|
| Example 1 | 11.9-13.0 | EC/DEC/DMC = 1/1/1 | 8.8 | A | A | A | A | A | — |
| Example 2 | 11.9-13.0 | EC/DEC/DMC = 1/1/1 | 8.8 | B | B | B | A | A | — |
| Example 3 | 11.9-13.0 | EC/DEC/DMC = 1/1/1 | 8.8 | B | B | B | B | A | — |
| Example 4 | 11.9-13.0 | EC/DEC/DMC = 1/1/1 | 8.8 | C | C | C | A | A | — |

TABLE 3-continued

| | Electrolytic solution | | | Evaluation results | | | | | |
|---|---|---|---|---|---|---|---|---|---|
| | Composition | | | Electrolytic | Electrolytic | | | Degassing insulation | |
| | SP value of additive compound | and proportion (mass ratio) of solvent | SP value | solution laminating strength | solution heat sealing strength | Degas heat seal strength | Molding whitening | Insulation properties | Insulation diminished site |
| Example 5 | 11.9-13.0 | EC/DEC/DMC = 1/1/1 | 8.8 | B | B | B | B | A | — |
| Example 6 | 11.9-13.0 | EC/DEC/DMC = 1/1/1 | 8.8 | B | B | B | A | A | — |
| Example 7 | 11.9-13.0 | EC/DEC/DMC = 1/1/1 | 8.8 | A | A | A | A | A | — |
| Example 8 | 11.9-13.0 | EC/DEC/DMC = 1/1/1 | 8.8 | C | B | B | A | B | — |
| Example 9 | 11.9-13.0 | EC/DEC/DMC = 1/1/1 | 8.8 | A | A | A | A | C | — |
| Example 10 | 11.9-13.0 | EC/DEC/DMC = 1/1/1 | 8.8 | A | A | A | A | B | — |
| Example 11 | 11.9-13.0 | EC/DEC/DMC = 1/1/1 | 8.8 | A | A | A | A | C | — |
| Example 12 | 11.9-13.0 | EC/DEC/DMC = 1/1/1 | 8.8 | B | B | B | B | A | — |
| Example 13 | 11.9-13.0 | PC/DEC/DMC = 1/1/1 | 8.5 | A | A | A | A | A | — |
| Example 14 | 11.9-13.0 | EC/DEC = 1/1 | 8.9 | A | A | A | A | A | — |
| Example 15 | 11.9-13.0 | PC/DEC = 1/1 | 8.5 | A | A | A | A | A | — |
| Example 16 | 11.9-13.0 | EC/DMC = 1/1 | 9.8 | A | A | A | A | A | — |
| Example 17 | 11.9-13.0 | PC/DMC = 1/1 | 9.3 | A | A | A | A | A | — |
| Example 18 | 13.1 | EC/DEC/DMC = 1/1/1 | 8.8 | A | A | A | A | A | — |
| Example 19 | 12.3 | EC/DEC/DMC = 1/1/1 | 8.8 | A | A | A | A | A | — |
| Example 20 | 12.3 | EC/DEC/DMC = 1/1/1 | 8.8 | B | A | B | B | A | — |
| Example 21 | 12.3 | EC/DEC/DMC = 1/1/1 | 8.8 | B | B | B | B | A | — |
| Example 22 | 12.3 | EC/DEC/DMC = 1/1/1 | 8.8 | C | B | C | B | A | — |
| Example 23 | 12.4-14.0 | EC/DEC/DMC = 1/1/1 | 8.8 | A | A | A | A | A | — |
| Example 24 | 12.5 | EC/DEC/DMC = 1/1/1 | 8.8 | A | A | A | A | A | — |
| Example 25 | 14.8 | EC/DEC/DMC = 1/1/1 | 8.8 | A | A | B | A | B | — |
| Example 26 | 12.5 | EC/DEC/DMC = 1/1/1 | 8.8 | A | A | A | A | C | — |
| Comparative Example 1 | 9.0 | EC/DEC/DMC = 1/1/1 | 8.8 | A | A | A | A | D | Degas sealed portion |
| Comparative Example 2 | 10.2 | EC/DEC/DMC = 1/1/1 | 8.8 | A | A | A | A | D | Degas sealed portion |
| Comparative Example 3 | 10.2 | EC/DEC/DMC = 1/1/1 | 8.8 | B | B | B | B | D | Degas sealed portion |
| Comparative Example 4 | 9.5 | EC/DEC/DMC = 1/1/1 | 8.8 | A | A | A | A | D | Degas sealed portion |
| Comparative Example 5 | 9.5 | EC/DEC/DMC = 1/1/1 | 8.8 | B | B | B | A | D | Degas sealed portion |
| Comparative Example 6 | — | EC/DEC/DMC = 1/1/1 | 8.8 | A | A | A | A | D | Degas sealed portion |

With regard to the composition of the solvent in Table 3, EC represents ethylene carbonate, DEC represents diethyl carbonate, DMC represents dimethyl carbonate, and PC represents propylene carbonate.

As is obvious from the results shown in Table 3, it has been confirmed that the packaging materials of Examples 1 to 26 have good insulation properties after degassing heat sealing. In addition, it has been confirmed that the packaging materials of Examples 1 to 26 also have sufficient performance with regard to the electrolytic solution laminating strength, the electrolytic solution heat sealing strength, and the degassing heat seal strength, and satisfy the fundamental performance of the packaging materials.

On the other hand, it has been confirmed that the insulation properties of the packaging materials of Comparative Examples 1 to 6 decreased after degassing heat sealing. Also, the insulation diminished sites after degassing heat sealing in the packaging materials of Comparative Examples 1 to 6 have been identified to be the degassing heat sealed portion.

REFERENCE SIGNS LIST

1 . . . Battery element, 2 . . . Lead, 10, 20 . . . Packaging material for power storage device, 11 . . . Substrate layer, 12 . . . First adhesive layer, 13 . . . Metallic foil layer, 14 . . . Anti-corrosion treatment layer, 15 . . . Adhesive resin layer, 16 . . . Sealant layer, 17 . . . Second adhesive layer, 30 . . . Packaging material of embossed type, 32 . . . Molded area (depressed part), 34 . . . Lid part, 40 . . . Sample, 41 . . . Deep drawing portion, 42 . . . Tab, 43 . . . Tab sealant, 44 . . . Upper side portion, 45 . . . Lateral side portion, 46 . . . Exposed portion of metallic foil layer, 47 . . . Lower side portion, 48 . . . Portion on the inner side with respect to the lower side portion, 49a, 49b . . . Electrode, 50 . . . Secondary battery, S1 . . . Sealed portion, S2 . . . Degassing heat sealed portion.

The invention claimed is:

1. A packaging material for a power storage device, comprising:
 a substrate layer;
 a metallic foil layer with an anti-corrosion treatment layer being disposed on one face or both faces of the metallic foil layer;
 a sealant layer; and
 an adhesive layer or an adhesive resin layer, wherein at least one of the adhesive layer or the adhesive resin layer is laminated between the metallic foil layer and the sealant layer,
  wherein at least one layer of the adhesive resin layer and the sealant layer comprises a polyolefin-based resin, and an additive compound with an SP value of 11.0 $(cal/cm^3)^{1/2}$ or more and 20.0 $(cal/cm^3)^{1/2}$ or less, and
  wherein the additive compound is at least one compound selected from the group consisting of sugar derivatives, phenol derivatives, copolymers of terpenoids and phenols, and hydroxy group-modified polyolefins.

2. The packaging material for the power storage device according to claim 1, wherein a molecular weight of the additive compound is 100 or more and 6000 or less.

3. The packaging material for the power storage device according to claim 1,
wherein the polyolefin-based resin comprises a polypropylene-based resin, and
wherein the sealant layer comprises at least one of a propylene-α-olefin copolymer as a compatible elastomer having compatibility with the polypropylene-based resin, and an ethylene-α-olefin copolymer as an incompatible elastomer not having compatibility with the polypropylene-based resin.

4. The packaging material for the power storage device according to claim 1, wherein the adhesive resin layer comprises an acid-modified polypropylene, and a polypropylene with an atactic structure or a propylene-α-olefin copolymer with an atactic structure.

5. The packaging material for the power storage device according to claim 1, wherein the adhesive layer comprises an acid-modified polyolefin, and at least one curing agent selected from the group consisting of a multifunctional isocyanate compound, a glycidyl compound, a compound having a carboxy group, a compound having an oxazoline group and a carbodiimide compound.

6. A power storage device comprising:
a battery element comprising electrodes;
leads extending from the electrodes;
a vessel accommodating the battery element; and
an electrolytic solution loaded in the vessel,
wherein the vessel includes the packaging material for the power storage device according to claim 1, such that the sealant layer of the packaging material is on an inner side of the vessel, the inner side facing the battery element.

7. The power storage device according to claim 6, wherein a difference between an SP value of the electrolytic solution, and an SP value of the additive compound in the packaging material for a power storage device is 2.0 $(cal/cm^3)^{1/2}$ or more.

* * * * *